(12) United States Patent
Matsumoto et al.

(10) Patent No.: US 8,536,246 B2
(45) Date of Patent: Sep. 17, 2013

(54) INK COMPOSITION, INK SET AND IMAGE FORMING METHOD

(75) Inventors: Jun Matsumoto, Kanagawa (JP); Masao Ikoshi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 282 days.

(21) Appl. No.: 12/972,547

(22) Filed: Dec. 20, 2010

(65) Prior Publication Data

US 2011/0227992 A1  Sep. 22, 2011

(30) Foreign Application Priority Data

Mar. 16, 2010  (JP) .................. 2010-059942

(51) Int. Cl.

| | |
|---|---|
| *A61K 6/083* | (2006.01) |
| *A61L 24/00* | (2006.01) |
| *B41J 2/01* | (2006.01) |
| *B41J 2/17* | (2006.01) |
| *C04B 28/26* | (2006.01) |
| *C08F 2/46* | (2006.01) |
| *C08F 299/04* | (2006.01) |
| *C08J 3/28* | (2006.01) |
| *C08K 3/34* | (2006.01) |
| *C08K 11/00* | (2006.01) |
| *C09D 5/00* | (2006.01) |
| *C09D 11/00* | (2006.01) |
| *G01D 11/00* | (2006.01) |
| *H05B 6/68* | (2006.01) |

(52) U.S. Cl.
USPC .................. 523/160; 347/1; 347/95; 347/96; 347/100; 347/102; 522/1; 522/77; 522/104; 522/184; 523/161; 524/442

(58) Field of Classification Search
USPC ............... 347/1, 95, 96, 100, 102; 522/1, 522/77, 104, 184; 523/160, 161; 524/442
See application file for complete search history.

(56) References Cited

U.S. PATENT DOCUMENTS

| 2,335,505 A | 11/1943 | Gessler |
| 5,919,291 A | 7/1999 | Hotomi et al. |

FOREIGN PATENT DOCUMENTS

| EP | 1721945 A1 | 11/2006 |
| GB | 194156 A | 3/1923 |
| JP | 62-218460 A | 9/1987 |
| JP | 10-273613 A | 10/1998 |
| JP | 10-287035 A | 10/1998 |
| JP | 2003-147238 A | 5/2003 |
| JP | 2003-165936 A | 6/2003 |
| JP | 2003-342501 A | 12/2003 |
| JP | 2007-314611 A | 12/2007 |
| JP | 2007-314612 A | 12/2007 |

OTHER PUBLICATIONS

English Machine translation of JP 10287035, Kiyohiko, Oct. 1998.*
English Machine translation of JP 2003-165936, Hitoshi et al., Jun. 2003.*
Partial English language translation of the following: Office action dated Jun. 18, 2013 from the Japanese Patent Office in a Japanese patent application corresponding to the instat patent application. This office action translation is submitted now in order to supplement the understanding of patent document JP 2007-314612, 2007-314611, 62-218460, 2003-342501, 10-2783613, and 2003-147238 which are cited in the office action and are being disclosed in the instant Information Disclosure Statement.

* cited by examiner

*Primary Examiner* — Patrick Niland
(74) *Attorney, Agent, or Firm* — SOLARIS Intellectual Property Group, PLLC

(57) ABSTRACT

The present invention provides an inkjet ink composition including color material particles, a water soluble polymerizable compound, a water soluble silicate salt and water, which is excellent in ejection stability even in a case in which the ink composition is stopped from ejecting in the inkjet recording device and left alone for a certain period of time, and ejection of the ink composition is resumed thereafter, which has a good maintenance property, and in which abrasion resistance of images formed with the ink composition is excellent; an ink set including the inkjet ink composition; and an image forming method using the ink set.

16 Claims, 2 Drawing Sheets

INK COMPOSITION, INK SET AND IMAGE FORMING METHOD

CROSS-REFERENCE TO RELATED APPLICATION

This application claims priority under 35 USC 119 from Japanese Patent Application No. 2010-059942, filed on Mar. 16, 2010, the disclosure of which is incorporated by reference herein.

BACKGROUND OF THE INVENTION

1. Field of the Invention

The present invention relates to an ink composition, an ink set, and an image forming method using the same, which are suitable for recording an image by jetting an ink according to an inkjet method.

2. Description of the Related Art

Inkjet technology has been applied as an image recording method that records color images in such fields as office printers and home printers. As an ink used for inkjet recording, studies are being made into having an aqueous pigment ink contain polymerizable monomers and then cure the ink, thereby improving abrasion resistance, and, for example, Japanese Patent Application Laid-Open (JP-A) No. 10-287035 discloses an inkjet recording method that prints by attaching, to a recording medium, a reaction liquid containing a photopolymerization initiator and a reactant that produces a coagulation substance through contact with an ink composition, the ink composition containing acrylate monomer, resin emulsion, and inorganic oxide colloid.

In addition, for example, JP-A No. 2003-165936 discloses an example containing silicate ions, for the purpose of preventing corrosion of members, in the aqueous ink composition that does not contain the above-mentioned polymerizable monomers.

SUMMARY OF THE INVENTION

According to an aspect of the invention, an inkjet ink composition including color material particles, a water soluble polymerizable compound, a water soluble silicate salt and water, which is excellent in ejection stability even in a case in which the ink composition is stopped from ejecting in the inkjet recording device and left alone for a certain period of time, and ejection of the ink composition is resumed thereafter, which has a good maintenance property, and in which abrasion resistance of images formed with the ink composition is excellent; an ink set including the inkjet ink composition; and an image forming method using the ink set, are provided.

[Technical Problem]

However, in each of the above techniques, in a case in which ejection of the ink composition by an inkjet recording device is stopped and the device is left alone for a certain period of time, and ejection of the ink composition is resumed thereafter, the ejection stability (the ability to recover from not being used) is extremely insufficient.

In addition, in the above techniques, there have been no studies regarding the maintenance property, that is, the ease of treatment during a process for removing excess ink composition attached to the members after ejection of ink (ease of removing excess ink composition), and further improvement has been demanded.

Furthermore, also improving abrasion resistance at the same time as the above improvement has been demanded.

The present invention has been made in consideration of the above problems, and, in particular, the object of the present invention is to provide an ink composition, an ink set, and an image forming method using the same that, even in a case in which the ink composition is stopped from ejecting in the inkjet recording device and left alone for a certain period of time, and ejection of the ink composition is resumed thereafter, have excellent ejection stability (the ability to recover from not being used); and that are excellent in terms of maintenance property and abrasion resistance of images.

[Solution to Problem]

Exemplary embodiments according to the aspect of the invention include, but are not limited to the following items <1> to <19>.

<1> An inkjet ink composition including color material particles, a water soluble polymerizable compound, a water soluble silicate salt and water.

<2> The inkjet ink composition according to the item <1>, wherein the water soluble silicate salt is a silicate salt of an alkali metal.

<3> The inkjet ink composition according to the item <2>, wherein the silicate salt of an alkali metal is represented by the following Formula (S):

$$x(M_2O) \cdot y(SiO_2) \qquad \text{Formula (S)}$$

wherein, in Formula (S), M represents sodium or potassium; x represents an integer of 1 or 2; and y represents an integer of from 1 to 4.

<4> The inkjet ink composition according to any one of the items <1> to <3>, further including a polymerization initiator that initiate polymerization of the water soluble polymerizable compound by irradiation of actinic energy radiation.

<5> The inkjet ink composition according to any one of the items <1> to <4>, wherein the water soluble polymerizable compound is represented by the following Formula (1):

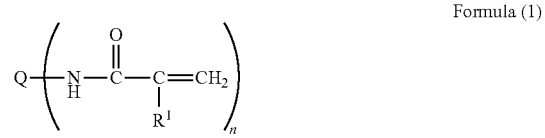

Formula (1)

wherein, in Formula (1), Q represents an n-valent linking group; $R^1$ represents a hydrogen atom or a methyl group: and n represents an integer of 1 or more.

<6> The inkjet ink composition according to any one of the items <1> to <5>, wherein a content of the water soluble silicate salt is in a range of from 0.0001% by mass to 0.5% by mass with respect to a total mass of the ink composition.

<7> The inkjet ink composition according to any one of the items <1> to <6>, wherein a content mass ratio of the water soluble silicate salt to the water soluble polymerizable compound, in the ink composition, is in a range of from 0.00005 to 0.1.

<8> The inkjet ink composition according to any one of the items <1> to <7>, wherein at least a part of a surface of each of the color material particles is covered with a polymer dispersant and the color material particles are water dispersible.

<9> The inkjet ink composition according to the item <8>, wherein the polymer dispersant comprises a carboxyl group.

<10> The inkjet ink composition according to any one of the items <1> to <9>, further including self-dispersing polymer particles.
<11> An ink set including: the inkjet ink composition according to any one of the items <1> to <10>; and a treatment liquid including a coagulant that is adapted to coagulate at least a part of the components in the inkjet ink composition.
<12> The ink set according to the item <11>, wherein the coagulant is an organic acid.
<13> An image forming method including discharging the inkjet ink composition according to any one of the items <1> to <10> via an inkjet head having a silicon nozzle plate, onto a recording medium, thereby forming an image.
<14> The image forming method according to the item <13>, further including applying a treatment liquid onto the recording medium, the treatment liquid being adapted to form an aggregate when contacted with the inkjet ink composition according to any one of the items <1> to <10>.
<15> The inkjet image forming method of the item <14>, wherein the inkjet ink composition is discharged after applying the treatment liquid, and the treatment liquid on the recording medium is heated and/or dried between a time after applying the treatment liquid onto the recording medium and a time of discharging the inkjet ink composition.
<16> The inkjet image forming method according to any one of the items <13> to <15>, wherein the recording medium includes plain paper or coated paper.

BRIEF DESCRIPTION OF DRAWINGS

Exemplary embodiments of the present invention will be described in detail based on the following figures, wherein.

DESCRIPTION OF EMBODIMENTS

Figure 1:
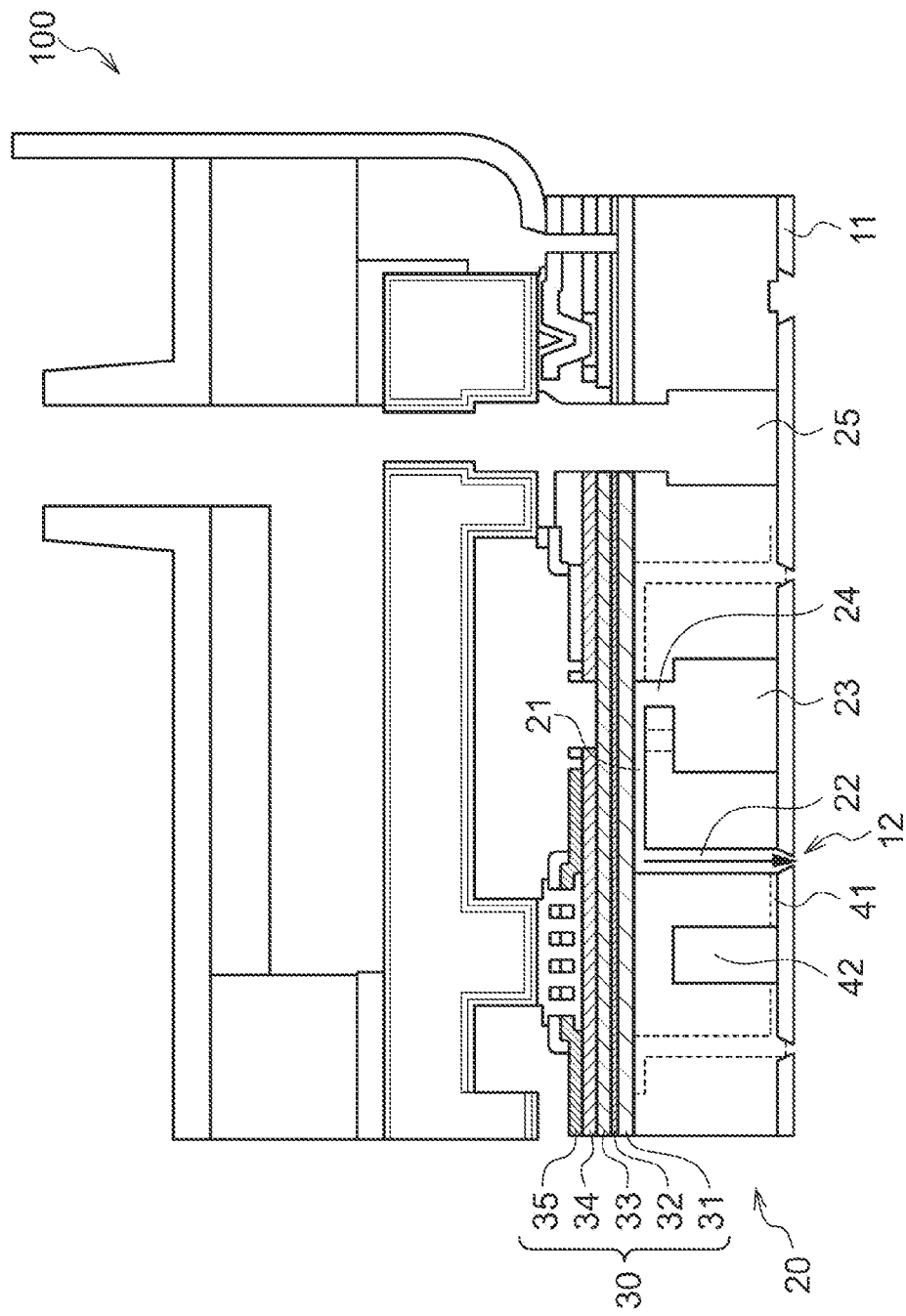
FIG. 1 is a schematic sectional diagram showing one example of an internal structure of an inkjet head.

Hereinafter, the ink composition, ink set, and image forming method using the same according to the present invention will be described in details.
<Ink Composition>
The ink composition for an inkjet use according to the present invention (hereinafter, also referred to simply as an ink composition) is a so-called aqueous ink composition that uses water as a medium, and contains at least one kind of color material particles, at least one kind of water-soluble polymerizable compound, at least one kind of water-soluble silicate salt, and water, and optionally contains other component(s). By using an ink composition with such a composition, it is possible to obtain excellent effects in terms of the ejection stability (recovery from disuse property) even in a case in which the ink composition is stopped from ejecting in the inkjet recording device and left alone for a certain period of time, and then ejection of the ink composition is resumed, and, furthermore, in the abrasion resistance of images and the maintenance property.
The mechanism of the present invention is not clear, but it can be considered that, since the ink composition according to the present invention contains water-soluble silicate salt together with a water-soluble polymerizable compound so as to effectively suppress the hydrolysis of the ink component and thus improve the stability of the ink composition, it is possible to obtain an excellent effect in terms of the ejection stability (recovery from disuse property) even in a case in which the ink composition is stopped from ejecting in the inkjet recording device and left alone for a certain period of time, and then ejection of the ink composition is resumed, and to provide the abrasion resistance of images compatible. Furthermore, it is considered that the attaching strength of the ink composition to the surface of members is controlled within an appropriate range by containing the water-soluble silicate so that the maintenance property, that is, the ease of treatment during the process for removing extra ink composition attached to the members after the ejection of ink (ease of removing extra ink composition) is improved.

(Silicate Salt)

The ink composition for an inkjet use according to the present invention contains at least one kind of water-soluble silicate salt. The water-soluble silicate is not particularly limited so long as it is a compound having water solubility, but an ammonium salt of silicic acid (for example, the tetramethyl ammonium salt of silicic acid) and a silicic acid alkali metal salt are preferable, and a silicic acid alkali metal salt is more preferable.

The silicic acid alkali metal salt includes silicic acid and alkali metal, and is not particularly limited so long as it is a compound having water solubility, and thus may be any one of, for example, an alkali metal salt of metasilicic acid or an alkali metal salt of orthosilicic acid, and, furthermore, may be a mixture thereof.

"Water-dissolvable" (also referred to simply as water-soluble) as used herein refers to an ability to dissolve in water at a concentration that is equal to or more than a certain level, and may refer to an ability to dissolve in an aqueous ink (preferably uniformly). The dissolution in an ink, which is preferably a uniform dissolution, may be achieved by an increase in solubility caused by addition of the below-mentioned water-soluble organic solvent. Specifically, "water-soluble" preferably refers to a water-solubility of at least 25% by mass at 25° C., and more preferably a water-solubility of at least 50% by mass at 25° C.

It is preferable that the silicic acid alkali metal salt be specifically at least one kind of the compounds represented by the following Formula (S).

$$x(M_2O) \cdot y(SiO_2) \quad \text{Formula (S)}$$

In Formula (S), M represents sodium or potassium; x represents an integer of 1 or 2; y represents an integer of from 1 to 4. The alkali metal salt of silicic acid represented by Formula (S) is called metasilicic acid alkali metal salt in the case of x=1, y=1, and orthosilicic alkali metal salt in the case of x=2, y=1, respectively, all of which are silicic acid alkali metal salt having a water solubility.

Generally, silicic acid alkali metal salt (alkali metal silicate) is often a mixture including two or more kinds of the compounds represented by Formula (S), but the silicic acid alkali metal salt used in the present invention may be a mixture including one kind of the compound represented by Formula (S) or two or more kinds of the compounds represented by Formula (S).

In the present invention, examples of water-soluble silicic acid alkali metal salts may include commercially available compounds (for example, liquid glass), and also may include substances obtained by melting silicic acid and the carbonate or hydroxide of an alkali metal, but a commercially available compound of sodium silicate or potassium silicate is preferable, and sodium silicate is most preferable.

The content of the water-soluble silicic acid (preferably silicic acid alkali metal salt) in the ink composition for an inkjet use according to the present invention is not particularly limited, but the content is preferably in a range of from 0.0001% by mass to 0.5% by mass with respect to the total amount of the ink composition, and more preferably in a range of from 0.001% by mass to 0.3% by mass, and even more preferably from in a range of 0.005% by mass to 0.1% by mass. When the content is in the above range, improvement in the recovery from disuse property and the maintenance property can be achieved effectively.

Furthermore, the ink composition according to the present invention preferably contains at least one kind of silicic acid alkali metal salt represented by Formula (S) in a range of from 0.0001% by mass to 0.5% by mass with respect to the total amount of the ink composition, and more preferably contains at least one kind selected from sodium silicate and potassium silicate (more preferably sodium silicate) in a range of from 0.001% by mass to 0.3% by mass with respect to the total amount of the ink composition.

(Polymerizable Compound)

In the present invention, the ink composition includes at least one water-soluble polymerizable compound having a polymerizable group that undergoes polymerization when irradiated with an actinic energy radiation. The polymerizable compound is used together with a color material described below, and, when the ink composition is contacted with the treatment liquid and coagulated, the polymerizable compound is incorporated into a space among particles, and an image is strengthened by subsequent curing through polymerization.

"Water-soluble" as used herein refers to an ability to dissolve in water at a concentration that is equal to or more than a certain level, and may refer to an ability to dissolve in an aqueous ink (preferably uniformly). The dissolution in an ink, which is preferably uniform dissolution, may be achieved by an increase in solubility caused by addition of the below-mentioned water-soluble organic solvent. Specifically, "water-soluble" preferably refers to a water-solubility of at least 10% by mass at 25° C., and more preferably a water-solubility of at least 15% by mass at 25° C.

A nonionic or cationic polymerizable compound is preferable as the polymerizable compound from the point that coagulation reaction of an aggregating agent (coagulant) may not be impaired, and the polymerizable compound having the water-solubility of 10% by mass or more (more preferably 15% by mass or more), is preferable.

Examples of the nonionic polymerizable monomer include a polymerizable compound such as (meth)acrylic monomers.

Examples of the (meth)acrylic monomer include a (meth)acrylic ester of a polyhydric alcohol, a (meth)acrylic ester of a glycidiyl ether of a polyhydric alcohol, a (meth)acrylic ester of polyethylene glycol, a (meth)acrylic ester of an ethylene oxide adduct of a polyhydric alcohol, and a UV-curable monomer or oligomer such as a reaction product between a polybasic acid anhydride and a hydroxyl-group-containing (meth)acrylic ester.

Among the (meth)acrylic monomers, the acrylic monomers are preferable.

The polyhydric alcohol may have a chain therein that is elongated by an ethylene oxide chain formed by addition of ethylene oxide.

Specific examples (nonionic compounds 1 to 6) of the nonionic polymerizable compound are shown below. However, the present invention is not intended to be limited thereto.

Nonionic polymerizable compound 1

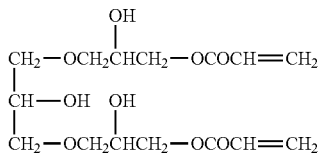

Nonionic polymerizable compound 2

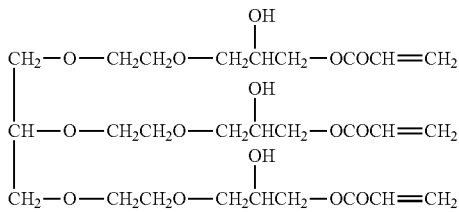

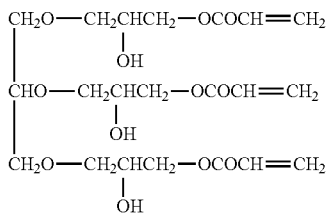

Nonionic polymerizable compound 3

Nonionic polymerizable compound 4

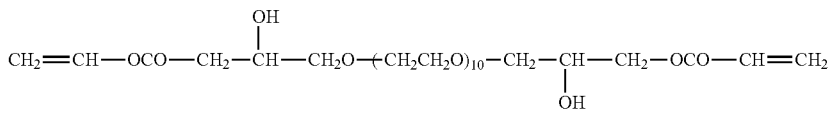

Nonionic polymerizable compound 5

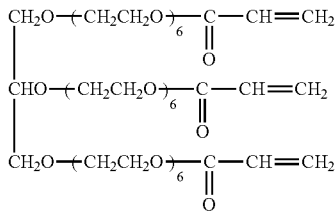

Nonionic polymerizable compound 6

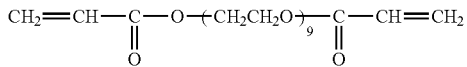

A (meth)acrylic ester having two or more (meth)acryloyl groups in a molecule thereof that may be derived from a compound having multiple hydroxyl groups may be also used. Examples of the compound having multiple hydroxyl groups include: a condensate of a glycol; an oligoether; and an oligoester.

Examples of the nonionic polymerizable compound further include a (meth)acrylic ester of a polyol having two or more hydroxyl groups such as monosaccharide or disaccharide; and a (meth)acrylic ester of triethanolamine, diethanolamine, trishydroxyaminomethane, trishydroxyaminoethane, or the like. Among the (meth)acrylic esters, the acrylic esters are preferable.

In addition, particularly preferable examples of nonionic polymerizable compounds include water-soluble polymerizable compounds having an acrylamide structure in the molecule.

The compounds represented by the following Formula (1) are preferable as the polymerizable compounds having an acrylamide structure in the molecule mentioned herein.

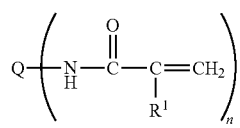

Formula (1)

In Formula (1), Q represents an n-valent linking group, and $R^1$ represents a hydrogen atom or a methyl group. In addition, n represents an integer of 1 or more.

The compound represented by Formula (1) is an unsaturated monomer bonded to the linking group Q by an amide bond. $R^1$ represents a hydrogen atom or a methyl group, and preferably a hydrogen atom. The valence n of the linking group Q is not particularly limited, but, from the viewpoints of improving the polymerization efficiency and ejecting stability, the valence n is preferably from 2 or more, and more preferably from 2 to 6, and even more preferably from 2 to 4.

In addition, the linking group Q is not particularly limited so long as it is a group that can bond with a (meth)acryiIamide structure, but it is preferable that the compound represented by Formula (1) be selected from linking groups that satisfy the above-mentioned water solubility condition. Specific examples can include residues of the compounds being selected from the following compound group X from which one or more of hydrogen atom(s) or hydroxyl group(s) are removed.

-Compound Group X- ethylene glycol, diethylene glycol, triethylene glycol, polyethylene glycol, propylene glycol, dipropylene glycol, tripropylene glycol, polypropylene glycol, 1,3-butanediol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thioglycol, trimethylolpropane, ditrimethylolpropane, trimethylolethane, ditrimethylolethane, neopentyl glycol, pentaerythritol, dipentaerythritol, and condensates thereof; polyols such as low molecular weight polyvinyl alcohol, saccharide and the like; polyamines such as ethylenediamine, diethylenetriamine, triethylenetetramine, polyethyleneimine, propylenediamine and the like.

Furthermore, examples can include substituted or unsubstituted alkylene chain groups having 4 or less carbon atoms, such as a methylene group, an ethylene group, a propylene group, a butylenes group and the like, functional groups having (a) saturated or unsaturated heterocyclic group(s), such as a pyridine ring group, an imidazole ring group, a pyrazine ring group, a piperidine ring group, a piperazine ring group, a morpholine ring group and the like.

As the linking group Q, among the above, polyols residues containing an oxyalkylene group (preferably an oxyethylene group) are preferable, and polyol residues containing 3 or more oxyalkylene groups (preferably oxyethylene groups) are particularly preferable.

Hereinafter, specific examples of compounds represented by Formula (1) (nonionic polymerizable compounds a to i) will be shown. However, the present invention is not limited thereto.

(a)

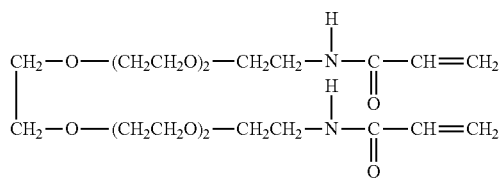

(b)

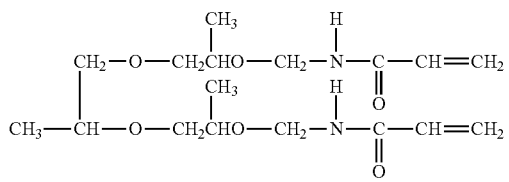

(c)

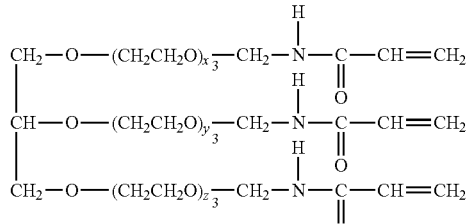

$x_3 + y_3 + z_3 = 6$

-continued
(d)
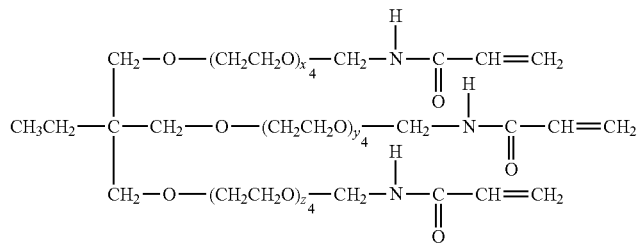
$x_4 + y_4 + z_4 = 9$
(e)
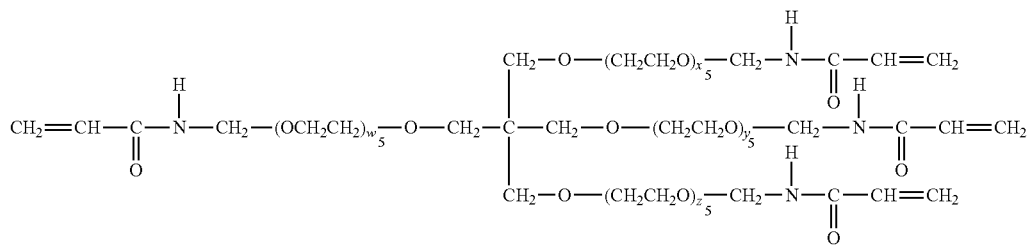
$w_5 + x_5 + y_5 + z_5 = 6$
(f)
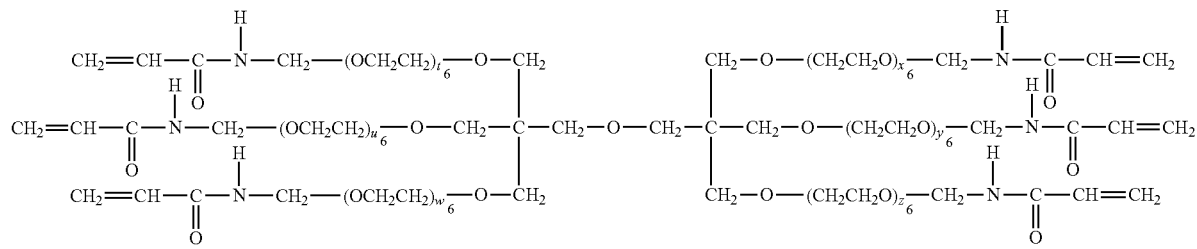
$t_6 + u_6 + w_6 + x_6 + y_6 + z_6 = 12$
(g)
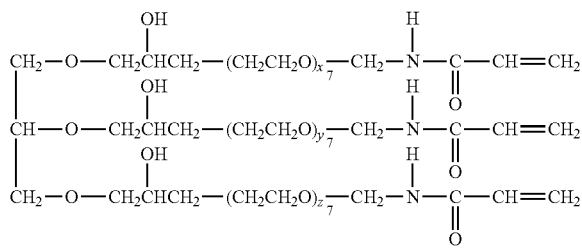
$x_7 + y_7 + z_7 = 3$
(h)
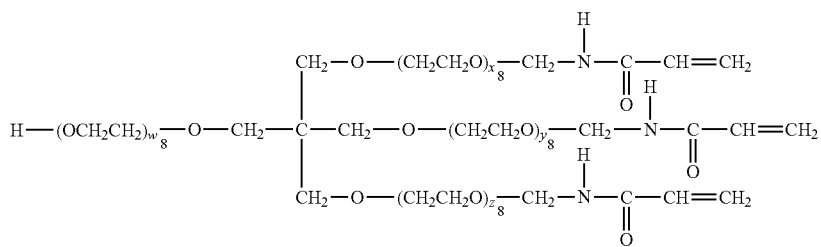
$w_8 + x_8 + y_8 + z_8 = 6$ -continued

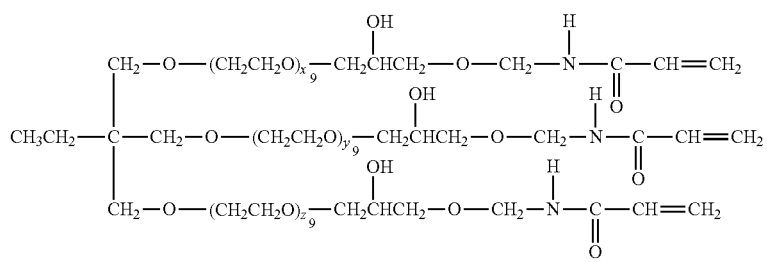

$x_9 + y_9 + z_9 = 3$ (i)

The cationic polymerizable compound is a compound having a cation group and a polymerizable group, such as an unsaturated double bond and preferable examples include epoxy monomers and oxetane monomers. When the cationic polymerizable compound is contained, the cationic properties of the ink composition increase due to the fact that the cation group is contained and color mixture when anionic inks are used is more effectively prevented.

Examples of the cationic polymerizable compound include N,N-dimethylaminoethyl methacrylate, N,N-dimethylaminoethyl acrylate, N,N-dimethylaminopropyl methacrylate, N,N-dimethylaminopropyl acrylate, N,N-dimethylamino acrylamide, N,N-dimethylamino methacrylamide, N,N-dimethylaminoethyl acrylamide, N,N-dimethylaminoethyl methacrylamide, N,N-dimethylaminopropyl acrylamide, N,N-dimethylaminopropyl methacrylamide, and quaternary compounds thereof.

Examples of the epoxy monomer include a glycidyl ether of a polyhydric alcohol, a glycidyl ester, and an aliphatic cyclic epoxide.

Examples of the cationic polymerizable compound include those having the following structures.

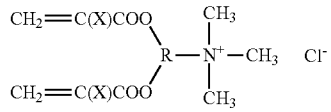

Structure 1

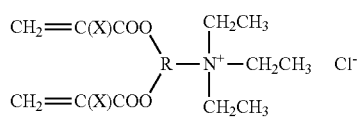

Structure 2

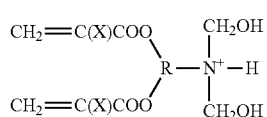

Structure 3

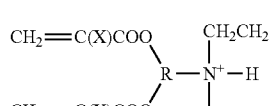

Structure 4

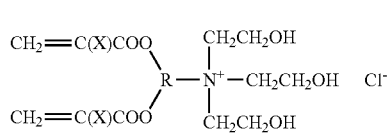

Structure 5

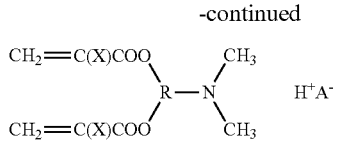

Structure 6

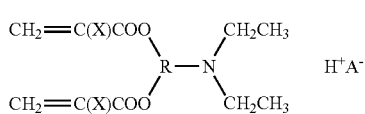

Structure 7

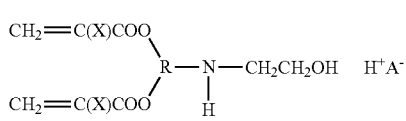

Structure 8

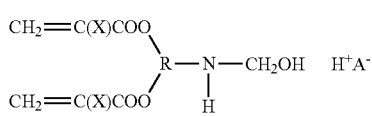

Structure 9

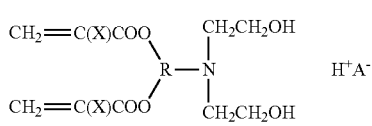

Structure 10

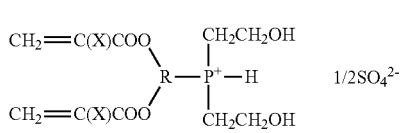

Structure 11

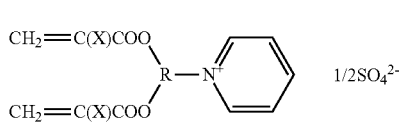

Structure 12

In the above structures, R represents a polyol residue; X represents H or $CH_3$; $A^-$ represents $Cl^-$, $HSO_3^-$, or $CH_3COO^-$. Examples of a compound used for introducing the polyol include glycerine, 1,2,4-butanetriol, 1,2,5-pentanetriol, 1,2,6-hexanetriol, trimethylolpropane, trimethylolmethane, trimethylolethane, pentaerhythritol, bisphenol A, alicyclic bisphenol A, and condensates thereof.

Specific examples of the polymerizable compound having a cationic group include those shown below (Cationic Compounds 1 to 11).

Cationic polymerizable compound 1
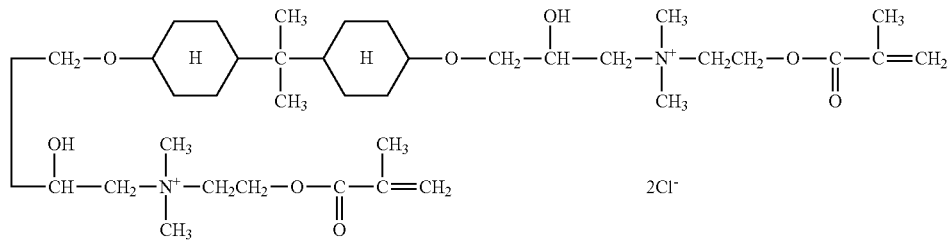
Here,
denotes a cyclohexane moiety.
Cationic polymerizable compound 2
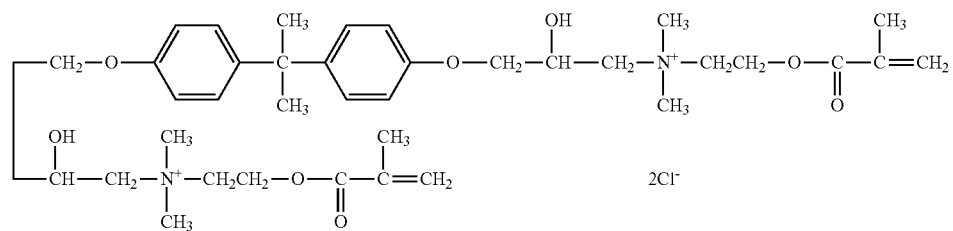
Cationic polymerizable compound 3
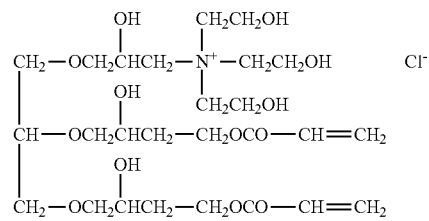
Cationic polymerizable compound 4
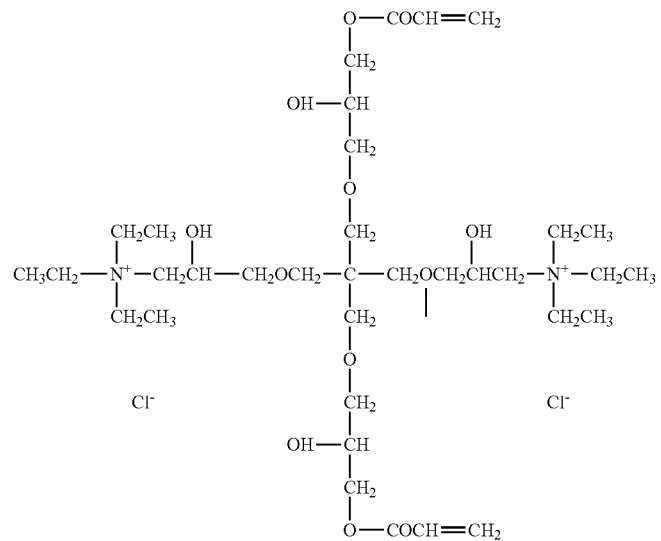

-continued
Cationic polymerizable compound 5
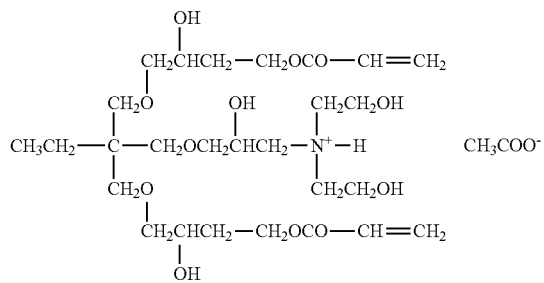
Cationic polymerizable compound 6
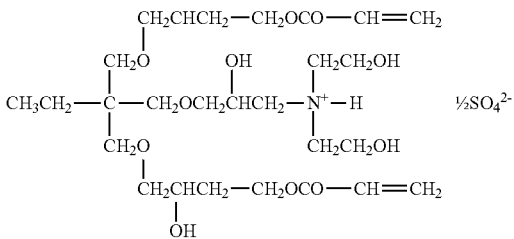
Cationic polymerizable compound 7
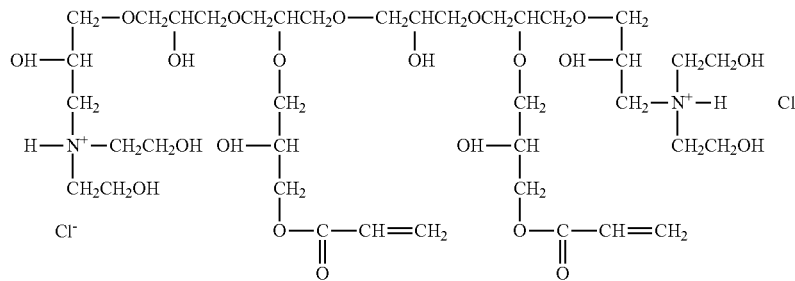
Cationic polymerizable compound 8
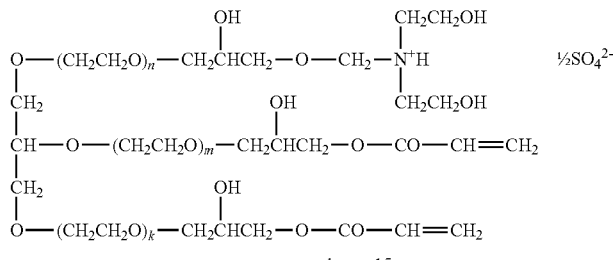
n + m + k = 15
Cationic polymerizable compound 9
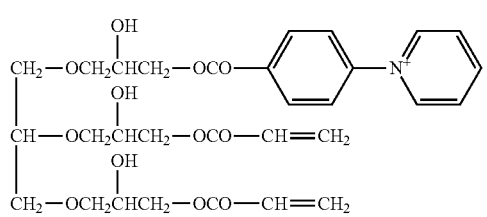
Cationic polymerizable compound 10
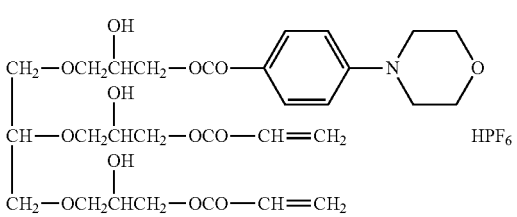
Cationic polymerizable compound 11
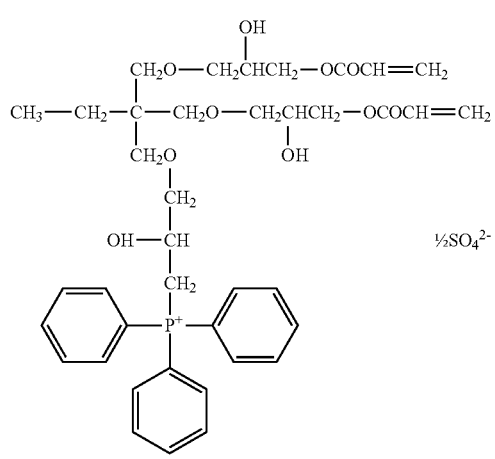

In the nonionic or cationic polymerizable compounds shown in the above, from the viewpoint of increasing the abrasion resistance, the compounds represented by Formula (1) are most preferable.

Polymerizable compounds can contain only one kind or a mixture of two or more kinds.

The content of the polymerizable compound in the ink composition is preferably from 5% by mass to 30% by mass, and more preferably from 10% by mass to 25% by mass. When the content of the polymerizable compound is 5% by mass or more, it is advantageous from the viewpoint of further improving the image strength so as to provide excellent abrasion resistance of images, and when the content is 30% by mass or less, it is advantageous from the point of pile height.

In addition, the content ratio of the water-soluble silicic acid with respect to the polymerizable compound in the ink composition according to the present invention (silicic acid/polymerizable compound) is, on a mass basis, preferably from 0.00005 to 0.1, and more preferably from 0.0001 to 0.01.

When the content ratio of the water-soluble silicic acid with respect to the polymerizable compound is from 0.00005 to 0.1, the recovery from disuse property and maintenance property can further be improved.

(Color Material Particles)

The ink composition for an inkjet use according to the present invention contains at least one kind of color material particles. The color material particles may include any substances having a function of forming images by coloring, and, for example, any one of a water-insoluble dye, a coloring fine particle, and a water-dispersible pigment can be used. In the present invention, a water-dispersible pigment is preferable from the viewpoints of, for example, light-fastness and the like.

Specific examples of the water-dispersible pigment may include the following pigments (1) to (4).

(1) An encapsulated pigment, that is, a polymer emulsion produced by including pigments in polymer particles, and, more specifically, a substance produced by coating a pigment with a water-insoluble polymer dispersing agent and then making the polymer layer on the surface of the pigment hydrophilic so as to disperse the pigments in the water.

(2) A self-dispersing pigment, that is, a pigment having at least one kind of hydrophilic group on the surface and showing water dispersibility in the absence of dispersing agents, and, more specifically, a substance produced by oxidizing the surface of, for example, mainly, carbon black to make it hydrophilic so as to make the pigment itself dispersible in the water.

(3) A resin-dispersed pigment, that is, a pigment dispersed by a water-soluble macromolecular weight compound (polymer) having the weight-average molecular weight of 50,000 or less.

(4) A surfactant-dispersed pigment, that is, a pigment being dispersed by a surfactant.

In the present invention, preferable examples can include (1) the encapsulated pigment and (2) the self-dispersing pigment, and a particularly preferable example can include (1) the encapsulated pigment. A pigment itself that provides the dispersibility is not limited, and can be appropriately selected according to purpose, and may be, for example, any one of an organic pigment or an inorganic pigment. A preferable pigment includes a pigment that is almost not dissolved or difficult to dissolve in water from the viewpoints of the ink coloring property.

Examples of the organic pigment include azo pigments, polycyclic pigments, dye chelates, nitro pigments, nitroso pigments, and aniline black. Among them, azo pigments and polycyclic pigments are more preferable. Examples of the inorganic pigments include titanium oxide, iron oxide, calcium carbonate, barium sulfate, aluminium hydroxide, barium yellow, cadmium red, chrome yellow, and carbon black. Among them, carbon black is especially preferable as a black pigment.

Examples of organic pigments for orange or yellow include C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180 and C. I. Pigment Yellow 185.

Organic pigments having a magenta or red color include C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, C.I. Pigment Red 222 and C. I. Pigment Violet 19.

Examples of organic pigments for green or cyan include C. I. Pigment Blue 15, C. I. Pigment Blue 15:2, C. I. Pigment Blue 15:3, C. I. Pigment Blue 15:4, C. I. Pigment Blue 16, C. I. Pigment Blue 60 and C. I. Pigment Green 7, and aluminum phthalocyanine pigments crosslinked with siloxane such as those described in U.S. Pat. No. 4,311,775.

Examples of organic pigments for black include C. I. Pigment Black 1, C. I. Pigment Black 6 and C. I. Pigment Black 7.

Preferable examples of the azo pigments include pigments represented by Formula (2) and tautomers thereof. Hereinafter, the azo pigments represented by Formula (2) will be described.

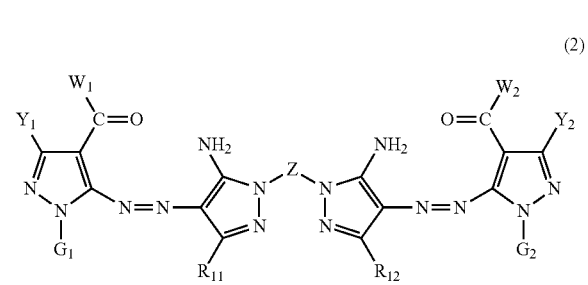

The compounds represented by Formula (2) are likely to form an intermolecular interaction due to the specific structure, and has low solubility with respect to water or organic solvents, whereby the compounds can be used as azo pigments.

Unlike dyes that are dissolved in water, organic solvents, or the like in a molecular dispersion state for use, the above azo pigments are finely dispersed in a solvent as solid particles, such as an aggregate of molecules, for use.

In Formula (2), Z represents a divalent group derived from a 5 to 8 membered nitrogen-containing heterocyclic ring, $Y^1$, $Y^2$, $R^{11}$, and $R^{12}$ each independently represent a hydrogen atom or a substituent, $G^1$ and $G^2$ each independently represent a hydrogen atom, an alkyl group, a cycloalkyl group, an aralkyl group, an alkenyl group, an alkynyl group, an aryl group, or a heterocyclic group, and $W^1$ and $W^2$ each independently represent an alkoxy group, an amino group, an alkyl group, or an aryl group.

In Formula (2), Z represents a divalent group derived from a 5 to 8 membered nitrogen-containing heterocyclic ring. Examples of a preferable nitrogen-containing heterocyclic ring without limiting the substitution position include a pyrrole ring, a pyrazole ring, a triazole ring, an imidazole ring, a thiazole ring, an isothiazole ring, an oxazole ring, an isooxazole ring, a thiadiazole ring, a thiophen ring, a furan ring, a pyridine ring, a pyrimidine ring, a triazine ring, and a pyridazine ring. The nitrogen-containing heterocyclic ring is more preferably a 6-membered nitrogen-containing heterocyclic ring, and examples include a pyridine ring, a pyrimidine ring, and an s-triazine ring. Z is particularly preferably a divalent group derived from the pyrimidine ring.

Z is preferably a 6 membered nitrogen-containing heterocyclic ring because the intramolecular action or intermolecular action of dye molecule is easy to be increased also due to hydrogen bonding properties and molecule flatness.

The divalent group derived from the 5 to 8 membered nitrogen-containing heterocyclic ring may be further fused.

When $Y^1$ and $Y^2$ represent a substituent, examples of the substituent include a halogen atom and an alkyl group (which is a straight-chain, branched-chain, or cyclic substituted or unsubstituted alkyl group and also includes a cycloalkyl group, a bicycloalkyl group, and a tricyclo structure having many ring structures; The alkyl group in substituents described below (e.g., an alkyl group in an alkoxy group, an alkyl carbonyl group, or an alkyl sulfonyl group) also represents the alkyl group having such a concept.), an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonyl amino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic-azo group, an imide group, a phosphino group, a phosphinyl group, a phosphinyloxy group, a phosphinylamino group, and a silyl group.

$Y^1$ and $Y^2$ are particularly preferably a hydrogen atom, an alkyl group (e.g., a methyl group), an aryl group (e.g., a phenyl group), a heterocyclic group (e.g., a 2-pyridyl group), and an alkylthio group (e.g., a methylthio group) and still more preferably a hydrogen atom, a methyl group, a phenyl group, and a methylthio group. Among the above, a hydrogen atom is most preferable. $Y^1$ and $Y^2$ may be the same or different.

In Formula (2), $R^{11}$ and $R^{12}$ represent a hydrogen atom or a substituent. When $R^{11}$ and $R^{12}$ represent a substituent, examples of the substituent include a straight or branched chain alkyl group having 1 to 12 carbon atoms (e.g., methyl, ethyl, n-propyl, i-propyl, n-butyl, i-butyl, sec-butyl, t-butyl, 2-ethylhexyl, 2-methyl sulfonyl ethyl, 3-phenoxy propyl, and trifluoro methyl), a straight or branched chain aralkyl group having 7 to 18 carbon atoms (e.g., benzyl), a straight or branched chain alkenyl group having 2 to 12 carbon atoms (e.g., vinyl), a straight or branched chain alkynyl group (e.g., ethynyl), a straight or branched chain cycloalkyl group of having 3 to 12 carbon atoms (e.g., cyclopentyl), a straight or branched chain cycloalkenyl group having 3 to 12 carbon atoms (e.g., cyclopentenyl), halogen atoms (e.g., chlorine and bromine), an aryl group (e.g., phenyl, 4-t-butylphenyl, and 2,4-di-t-amylphenyl), a heterocyclic group (e.g., imidazolyl, pyrazolyl, triazolyl, 2-furyl, 2-thienyl, 2-pyrimidinyl, and 2-benzothiazolyl), a cyano group, a hydroxyl group, a nitro group, a carboxyl group, an amino group, an alkyloxy group (e.g., methoxy, ethoxy, 2-methoxy ethoxy, and 2-methyl sulfonyl ethoxy), an aryloxy group (e.g., phenoxy, 2-methylphenoxy, 4-t-butylphenoxy, 3-nitrophenoxy, 3-t-butyloxy carbonyl phenoxy, 3-methoxy carbonyl phenyloxy, an acyl amino group (e.g., acetamide, benzamide, and 4-(3-t-butyl 4-hydroxy phenoxy)butane amide), an alkylamino group (e.g., methylamino, butylamino, diethylamino, and methylbutylamino), an arylamino group (e.g., phenylamino and 2-chloroanilino), a ureido group (e.g., phenylureido, methylureido, and N,N-dibutylureido), a sulfamoyl amino group (e.g., N,N-dipropyl sulfamoyl amino), an alkylthio group (e.g., methylthio, oethylthio, and 2-phenoxyethylthio), an arylthio group (e.g., pheylthio, 2-butoxy-5-t-octylpheylthio, and 2-carboxypheylthio), an alkyloxy carbonyl amino group (e.g., methoxy carbonyl amino), an alkylsulfonylamino group and an arylsulfonylamino group (e.g., methylsulfonylamino, phenylslufonylamino, and p-toluenesulfonylamino), a carbamoyl group (e.g., N-ethyl carbamoyl and N,N-dibutylcarbamoyl), a sulfamoyl group (e.g., N-ethylsulfamoyl, N,N-dipropylsulfamoyl, and N-phenylsulfamoyl), a sulfonyl group (e.g., methylsulfonyl, octylsulfonyl, phenylslufonyl, and p-toluenesulfonyl), an alkyloxycarbonyl group (e.g., methoxycarbonyl and butyloxycarbonyl), a heterocyclic oxy group (e.g., a 1-phenyl tetrazol-5-oxy and 2-tetrahydropyranyloxy), an azo group (e.g., phenylazo, 4-methoxyphenylazo, 4-pivaloylaminophenylazo, and 2-hydroxy-4-propanoylphenylazo), an acyloxy group (e.g., acetoxy), a carbamoyloxy group (e.g., N-methylcarbamoyloxy and N-phenylcarbamoyloxy), a silyloxy group (e.g., trimethylsilyloxy and dibutylmethylsilyloxy), an aryloxycarbonylamino group (e.g., phenoxycarbonylamino), an imido group (e.g., N-succinimido and N-phthalimido), a heterocyclic thio group (e.g., 2-benzothiazolylthio, 2,4-di-phenoxy-1,3,5-triazole-6-thio, and 2-pyridylthio), a sulfinyl group (e.g., 3-phenoxypropylsulfinyl), a phosphonyl group (e.g., phenoxyphosphonyl, octyloxyphosphonyl, and phenylphosphonyl), an aryloxycarbonyl group (e.g., phenoxycarbonyl), an acyl group (e.g., acetyl, 3-phenylpropanoyl, and benzoyl), and an ionic hydrophilic group (e.g., a carboxyl group, a sulfo group, a phosphono group, and a quaternary ammonium group).

In Formula (2), $R^{11}$ and $R^{12}$ each are preferably a substituted or unsubstituted acylamino group having a total number of carbon atoms of 1 to 8, a substituted or unsubstituted alkyl group having a total number of carbon atoms of 1 to 12, a substituted or unsubstituted aryl group having a total number of carbon atoms of 6 to 18, or a substituted or unsubstituted heterocyclic group having a total number of carbon atoms of 4 to 12, more preferably a straight chain alkyl group or a branched chain alkyl group having a total number of carbon atoms of 1 to 8, still more preferably a methyl group or a t-butyl group, and most preferably a t-butyl group among the above.

By using a straight chain alkyl group or a branched chain alkyl group having a small total number of carbon atoms (e.g., number of carbon atoms of 1 to 4) for $R^{11}$ and $R^{12}$, more excellent hue, coloring strength, and image fastness can be achieved.

$R^{11}$ and $R^{12}$ may be the same or different.

$G^1$ and $G^2$ represent a hydrogen atom, an alkyl group, a cycloalkyl group, an aralkyl group, an alkenyl group, an alkynyl group, an aryl group, or a heterocyclic group, particularly preferably a hydrogen atom, a methyl group, an ethyl group, an n-propyl group, an i-propyl group, a t-butyl group, a cyclo propyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, and a pyrazinyl group, and still more preferably a hydrogen atom, a methyl group, a phenyl group, a pyridyl group, a pyrimidinyl group, and a pyrazinyl group. Among the above, a methyl group, 2-pyridyl group, 2,6-pyrimidinyl group, and 2,5-pyrazinyl group are preferable.

When $G^1$ and $G^2$ represent an alkyl group, an alkyl group having a total number of carbon atoms of 5 or lower is preferable, an alkyl group having a total number of carbon atoms of 3 or lower is more preferable, and a methyl group is the most preferable. $G^1$ and $G^2$ may be the same or different.

In Formula (2), $W^1$ and $W^2$ represent an alkoxy group, an amino group, an alkyl group, or an aryl group.

The alkoxy group represented by $W^1$ and $W^2$ is preferably a substituted or unsubstituted alkoxy group having 1 to 30 carbon atoms and particularly preferably a substituted or unsubstituted alkoxy group of having 1 to 5 carbon atoms. Examples include a methoxy group, an ethoxy group, an i-propoxy group, a t-butoxy group, an n-octyloxy group, and a 2-methoxy ethoxy group.

Examples of the amino group represented by $W^1$ and $W^2$ include an alkylamino group, an arylamino group, and a heterocyclic amino group. Preferable examples include an amino group, a substituted or unsubstituted alkylamino group having 1 to 30 carbon atoms, and a substituted or unsubstituted anilino group having 6 to 30 carbon atoms. Among the above, an amino group, a substituted or unsubstituted alkylamino group having 1 to 8 carbon atoms, and a substituted or unsubstituted anilino group having 6 to 18 carbon atoms are preferable and an amino group, a substituted or unsubstituted alkylamino group having 1 to 4 carbon atoms, and a substituted or unsubstituted anilino group having 6 to 12 carbon atoms are more preferable. Examples of the amino group include an amino group (—$NH_2$), a methylamino group (—$NHCH_3$), a dimethylamino group {—$N(CH_3)_2$}, an anilino group (—NHPh), an N-methylanilino group {—N($CH_3$)Ph}, and a diphenylamino group {-$N(Ph)_2$}.

Examples of the alkyl group represented by $W^1$ and $W^2$ each independently include a straight chain, branched chain, or cyclic substituted or unsubstituted alkyl group and also includes a cycloalkyl group, a bicycloalkyl group, and a tricyclo structure having a large number of ring structures.

Specific preferable examples of the alkyl group include an alkyl group having 1 to 30 carbon atoms, such as a methyl group, an ethyl group, an n-propyl group, an i-propyl group, a t-butyl group, an n-octyl group, an eicosyl group, a 2-chloroethyl group, a 2-cyanoethyl group, and a 2-ethylhexyl group. Preferable examples of the cycloalkyl group include a substituted or unsubstituted cycloalkyl group having 3 to 30 carbon atoms, such as a cyclohexyl group, a cyclopentyl group, and a 4-n-dodecylcyclohexyl group. Specific examples of the bicycloalkyl group include a substituted or unsubstituted bicycloalkyl group having 5 to 30 carbon atoms, i.e., a monovalent group in which one hydrogen atom is removed from bicycloalkane having 5 to 30 carbon atoms, such as a bicyclo[1.2.2]heptane-2-yl group and a bicyclo [2.2.2]octane-3-yl group.

Preferable examples of the aryl group represented by $W^1$ and $W^2$ include a substituted or unsubstituted aryl group having 6 to 30 carbon atoms. Among the above, a substituted or unsubstituted aryl group having 6 to 18 carbon atoms is preferable and a substituted or unsubstituted aryl group having 6 to 12 carbon atoms is more preferable. Examples of the aryl group include a phenyl group, a p-tolyl group, a naphthyl group, an m-chlorophenyl group, and an o-hexadecanoylaminophenyl group.

Among the above, $W^1$ and $W^2$ each are preferably an alkoxy group (e.g., a methoxy group, an ethoxy group, an i-propoxy group, and a t-butoxy group), an amino group (e.g., a —$NH_2$ group, a methylamino group, a dimethylamino group, and an anilino group), an alkyl group (e.g., a methyl group, an ethyl group, an n-propyl group, an i-propyl group, a t-butyl group, and a cyclo propyl group), or an aryl group (e.g., a phenyl group, a p-tolyl group, and a naphthyl group). Among the above, an alkoxy group, an amino group, a phenyl group, or an alkyl group is preferable and an alkoxy group and an amino group are more preferable.

$W^1$ and $W^2$ each are more preferably an alkoxy group having a total number of carbon atoms of 5 or lower, an amino group (a —$NH_2$ group), and an alkylamino group having a total number of carbon atoms of 5 or lower. The embodiments that $W^1$ and $W^2$ each independently represent an alkoxy group having a total number of carbon atoms of 5 or lower, an amino group, and an alkylamino group having a total number of carbon atoms of 5 or lower are preferable in that dye molecules are easy to form rigidly a hydrogen bond at least one of in a molecule or between molecules and an excellent hue and a high fastness (e.g., light fastness, gas resistance, heat resistance, water resistance, and chemical resistance) are achieved.

In terms of hue, light fastness, and solvent resistance, an alkoxy group having a total number of carbon atoms of 3 or lower, an amino group (a —$NH_2$ group), and an alkylamino group having a total number of carbon atoms of 3 or lower are particularly preferable. Among the above, a methoxy group (a —$OCH_3$ group) or an ethoxy group (a —$OC_2H_5$ group) is preferable and a methoxy group is particularly preferable from the viewpoint of excellent hue and improvement of light fastness.

$W^1$ and $W^2$ may be the same or different.

In the present invention, when Z, $Y^1$, $Y^2$, $R^{11}$, $R^{12}$, $G^1$, $G^2$, $W^1$, and $W^2$ further have a substituent, examples include the following substituents.

Examples of the substituent include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxy carbonyloxy group, an amino group, an acylamino group, an aminocarbonylamino group, an alkoxycarbonylamino group, an aryloxycarbonylamino group, a sulfamoylamino group, an alkyl- or an aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic-azo group, an imide group, a phosphino group, a phosphinyl group, a phosphinyloxy group, a phosphinylamino group, and a silyl group.

Dispersing Agent

As the dispersing agent (dispersant) of the color material particles, any suitable polymer dispersing agents or low molecular surfactant type dispersing agents may be acceptable. The polymer dispersing agents may be water-soluble dispersing agents or water-insoluble dispersing agents.

The low molecular surfactant type dispersing agents can make the pigment disperse stably in a water solvent while maintaining the ink at a low viscosity. The low molecular surfactant type dispersing agents are low molecular dispersing agents having a molecular weight of 2,000 or lower. The molecular weight of the low molecular surfactant type dispersing agents is preferably 100 to 2,000 and more preferably 200 to 2,000.

The low molecular surfactant type dispersing agents have a structure containing a hydrophilic group and a hydrophobic group. One or more hydrophilic groups and one or more hydrophobic groups may each independently be contained in the molecule of the dispersing agent and plural kinds of hydrophilic groups or hydrophobic groups may be contained in the molecule. A linking group for connecting the hydrophilic group and the hydrophobic group may be contained as appropriate.

Examples of the hydrophilic group include an anionic group, a cationic group, a nonionic group, or a betaine type group in which these groups are combined. Any suitable anionic group may be used insofar as the anionic group has a negative charge. The anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group and a carboxylic acid group, and still more preferably a carboxylic acid group. Any suitable cationic group may be used insofar as the cationic group has a positive charge and is preferably an organic cationic substituent and more preferably a cationic group of nitrogen or phosphorus. The cationic group is still more preferably pyridinium cation or ammonium cation. Examples of the nonionic group include polyethylene oxide, polyglycerin, and a part of sugar units.

The hydrophilic group is preferably an anionic group. The anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group or a carboxylic acid group, and even more preferably a carboxylic acid group.

When the low-molecular surfactant-type dispersant has an anionic hydrophilic group, the dispersant preferably has a pKa of 3 or more, in terms of promoting coagulation reaction upon contacting with an acidic treatment liquid. The pKa mentioned here is an experimentally-obtained value based on a titration curve which is obtained by titrating a 1 mmol/L solution of a low-molecular surfactant-type dispersant in tetrahydrofuran/water at a ratio of 3:2 (THF-water, V/V) with an acid or alkali aqueous solution. When the pKa of the low-molecular surfactant-type dispersant is 3 or more, 50% or more of the anionic groups theoretically become undissociated upon contact with a liquid having a pH of around 3. Accordingly, the water-solubility of the low molecular surfactant-type dispersant is significantly reduced, as a result of which a coagulation reaction occurs, namely, the coagulation reactivity is improved. From this point of view, the low-molecular surfactant-type dispersant preferably has a carboxyl group as an anionic group.

The hydrophobic group has, for example, a hydrocarbon structure, a fluorocarbon structure, or a silicone structure. Among these, the hydrocarbon structure is especially preferable. The hydrophobic group may have either a straight-chain structure or a branched structure. Further, the hydrophobic group may have a single-chain structure or multi-chain structure. When there are two or more chains, the chains may include two or more kinds of hydrophobic group. The hydrophobic group is preferably a hydrocarbon group having a carbon number of from 2 to 24, more preferably from 4 to 24, and yet more preferably from 6 to 20.

When the polymeric dispersant is a water-soluble dispersant, examples thereof include a hydrophilic polymeric dispersant. Examples of natural hydrophilic polymeric compounds include plant polymers such as gum arabic, gum tragacanth, guar gum, gum karaya, locust bean gum, arabinogalactan, pectin and quince seed starch; marine alga polymers such as alginic acid, carrageenan and agar; animal polymers such as gelatin, casein, albumin and collagen; and microbial polymers such as xanthene gum and dextran.

Examples of hydrophilic polymeric compounds obtained by modifying natural raw materials include fibrous polymers such as methyl cellulose, ethyl cellulose, hydroxyethyl cellulose, hydroxypropyl cellulose and carboxymethyl cellulose; starch polymers such as sodium starch glycolate (sodium salt of starch glycolate), and sodium starch phosphate (sodium salt of starch phosphate[ester]); and marine alga polymers such as sodium alginate and propylene glycol alginate.

Examples of synthetic hydrophilic polymeric compounds include vinyl polymers such as polyvinyl alcohol, polyvinyl pyrrolidone and polyvinyl methyl ether; acrylic resins such as non-crosslinked polyacrylamide, polyacrylic acid or an alkali metal salt thereof, and water-soluble styrene acrylic resins; water-soluble styrene maleic acid resin; water-soluble vinylnaphthalene acrylic resin; water-soluble vinylnaphthalene maleic acid resins; alkali metal salts of formalin condensates of β-naphthalene sulfonic acid; polymeric compounds having, at a side chain, a salt of a cationic functional group such as a quaternary ammonium group or an amino group; and natural polymeric compounds such as shellac.

Among these, water-soluble dispersants to which a carboxyl group is introduced are preferable, and examples thereof include homopolymers of acrylic acid, methacrylic acid or styrene acrylic acid, and copolymers of the above monomer (s) with another monomer having a hydrophilic group.

The water-insoluble dispersants include a polymer having both hydrophilic and hydrophobic moieties, such as styrene-(meth)acrylic acid copolymer, styrene-(meth)acrylic acid-(meth)acrylate copolymer, (meth)acrylate-(meth)acrylic acid copolymer, polyethylene glycol(meth)acrylate-(meth)acrylic acid copolymer, vinylacetate-maleic acid copolymer, and styrene-maleic acid copolymer.

The weight average molecular weight of the polymer dispersant is preferably from 3,000 to 100,000, more preferably from 5,000 to 50,000, further preferably from 5,000 to 40,000, and yet further preferably from 10,000 to 40,000.

The polymer dispersing agent (dispersant) preferably contains a polymer having a carboxyl group from the viewpoints of self-dispersiblity and rate of coagulation when the below-mentioned treatment liquid comes into contact, and a preferable polymer includes a polymer having a carboxyl group and the acid value of 100 mgKOH/g or less, and a more preferable polymer includes a polymer having a carboxyl group and the acid value in a range of from 25 mgKOH/g to 100 mgKOH/g. Particularly in the case of using a combination of the ink composition according to the present invention and a treatment liquid (specifically described below) that aggregates the components in the ink composition, a polymer dispersing agent having a carboxyl group and the acid value in a range of from 25 mgKOH/g to 100 mgKOH/g is effective.

The mixed mass ratio (p:s) between the pigment (p) and the dispersing agent (s) is preferably from 1:0.06 to 1:3, and more preferably from 1:0.125 to 1:2, and even more preferably from 1:0.125 to 1:1.5.

In the present invention, from the viewpoints of, for example, the light-fastness and quality of image, the color material particle preferably contains a pigment and a dispersing agent, and more preferably contains an organic pigment and a polymer dispersing agent, and particularly preferably contains an organic pigment and a polymer dispersing agent containing a carboxyl group. In addition, from the viewpoints of aggregability, the pigment is preferably coated with a water-insoluble polymer dispersing agent having a carboxyl group. The water-insoluble polymer refers to a polymer exhibiting an amount of dissolution of 10 g or less when dried at 105° C. for 2 hours and then dissolved in 100 g of water at 25° C., and the amount of dissolution is preferably 5 g or less, and more preferably 1 g or less. The amount of dissolution refers to an amount of dissolution when being 100% neutralized by sodium hydroxide or acetic acid, depending on the kind of the salt-forming group of the water-insoluble polymer.

The average particle diameter of the pigment in the dispersion state is preferably from 10 nm to 200 nm, more preferably from 10 nm to 150 nm, and still more preferably from 10 nm to 100 nm. When the average particle diameter is 200 nm or less, color reproducibility is excellent, and ejecting properties are excellent when ejecting droplets by an inkjet method. When the average particle diameter is 10 nm or more, light fastness becomes excellent. The particle size distribution of the colorant is not particularly limited, and may be a broad particle size distribution or a monodispersed particle size distribution. It is also possible to use a mixture of two or more colorants having monodispersed particle size distributions.

The average particle diameter of the pigment in the dispersion state and the average particle diameter and the particle size distribution of the polymer particles are obtained by measuring volume average particle diameter by a dynamic light scattering method, using a Nanotrac particle size distribution measuring instrument UPA-EX150 (trade name, manufactured by NIKKISO Co., Ltd.).

The pigment may be used singly or in a combination of two or more thereof.

From the viewpoint of the density of an image formed from the ink composition, the content of the pigment in the ink composition may be preferably from 1% by mass to 25% by mass, more preferably from 2% by mass to 20% by mass, even more preferably from 2% by mass to 15% by mass, and further preferably from 3% by mass to 10% by mass, with respect to the total amount of the ink composition.

Water-soluble Organic Solvent

The ink composition used in the present invention may include at least one kind of water-soluble organic solvent. By including the water-soluble organic solvent, effects of drying prevention, moistening, promoting penetration or the like may be obtained. In order to prevent drying, the solvent may be used as a anti-drying agent for preventing nozzle clogging due to aggregation of ink that has attached and dried at an ejection port of a jetting nozzle. In terms of drying prevention or moistening, a water-soluble organic solvent having a lower vapor pressure than that of water is preferably used. In terms of promoting penetration, the solvent may be used as a penetration promoter for improving the penetration ability of ink into a paper.

As an anti-drying agent, the water-soluble organic solvent preferably has a lower vapor pressure than that of water. Examples of such a solvent include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane; lower alkyl ethers of polyhydric alcohols, such as ethylene glycol monomethyl ether, ethylene glycol monoethyl ether, diethylene glycol monomethyl ether, diethylene glycol monoethyl ether, triethylene glycol monoethyl ether and triethylene glycol monobutyl ether; heterocyclic compounds such as 2-pyrrolidone, N-methyl-2-pyrrolidone, 1,3-dimethyl-2-imidazolidinone and N-ethyl morpholine; sulfur-containing compounds such as sulfolane, dimethyl sulfoxide and 3-sulfolene; polyfunctional compounds such as diacetone alcohol and diethanol amime; and urea derivatives.

Among these, polyhydric alcohols such as glycerin and diethylene glycol are preferable as anti-drying agents.

The anti-drying agent may be used singly or in a combination of two or more thereof. The content of anti-drying agent in the ink composition is preferably from 10 to 50 mass %.

As the penetration promoter, the water-soluble organic solvent is favorably used in order to promote the penetration of ink composition into a recording medium (such as printing paper). Examples of such a solvent include alcohols such as ethanol, isopropanol, butanol, diethylene glycol monobutyl ether, triethylene glycol monobutyl ether and 1,2-hexanediol, sodium lauryl sulfate, sodium oleate, and nonionic surfactants.

The penetration promoter may be used singly or in combination of two or more thereof. The content of penetration promoter in the ink composition is preferably from 5 to 30 mass %. The use amount of the penetration promoter is preferably in a range in which image bleeding or print through is not caused.

The water-soluble organic solvent may be used also for adjusting the viscosity of the ink composition. Examples of the water-soluble organic solvent that may be used as a viscosity adjuster include alcohols such as methanol, ethanol, propanol, isopropanol, butanol, isobutanol, sec-butanol, t-butanol, pentanol, hexanol, cyclohexanol and benzyl alcohol; polyhydric alcohols such as ethylene glycol, diethylene glycol, triethylene glycol, polyethyelene glycol, propylene glycol, dipropylene glycol, polypropylene glycol, butylene glycol, hexanediol, pentanediol, glycerin, hexanetriol and thiodiglycol; glycol derivatives such as ethylene glycol monomethyl ether, ethylene glycol monoethyl ether, ethyelene glycol monobutyl ether, diethyelene glycol monomethyl ether, diethylene glycol monobutyl ether, propylene glycol monomethyl ether, propylene glycol monobutyl ether, dipropylene glycol monomethyl ether, triethyelene glycol monomethyl ether, ethylene glycol diacetate, ethylene glycol monomethyl ether acetate, triethylene glycol monomethyl ether, triethylene glycol monoethyl ether and ethylene glycol monophenyl ether; amines such as ethanol amine, diethanol amine, triethanol amine, N-methyl diethanol amine, N-ethyl diethanol amine, morpholine, N-ethyl morpholine, ethylene diamine, diethylene triamine, triethylene tetramine, polyethylene imine and tetramethyl propylene diamine; and other polar solvents such as formamide, N,N-dimethyl formamide, N,N-dimethylacetoamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone. Any of these solvents may be used singly or in combination of two or more thereof.

Polymer particles may be contained in an ink composition of the exemplary embodiment of the invention. As the polymer particles, self-dispersing polymer particles are preferable.

In the following, self-dispersing polymer particles, as an example of preferable polymer particles, are described in detail.

Self-Dispersing Polymer Particles

In the present invention, the ink composition preferably includes, as the polymer particles, at least one type of self-dispersing polymer particles. The self-dispersing polymer particles have a function to immobilize the ink composition when contacting with the below-mentioned treatment liquid or an area on which the treatment liquid has been applied and dried. When contacting with the treatment liquid or the area, the dispersion state of the self-dispersing polymer particles becomes unstable and the self-dispersing polymer particles aggregate, whereby the viscosity of the ink is increased and the immobilization of the ink composition is achieved. Thus, the self-dispersing polymer particles further improve the fixability of the ink composition to a recording medium and the abrasion resistance of an image. The self-dispersing polymer particles are considered to be preferable resin particles also from the viewpoint of ejecting stability and liquid stability (particularly, dispersion stability) of the system containing the pigment.

The self-dispersing polymer particles are particles of a water-insoluble polymer that does not contain a free emulsifier and that can get into a dispersed state (particularly, dispersed state achieved by a phase inversion emulsification) in an aqueous medium even in the absence of the other surfactants due to a functional group (particularly, an acidic group or a salt thereof) which the polymer itself has.

Here, the term dispersed state includes both an emulsified state (emulsion) in which a water-insoluble polymer is dispersed in an aqueous medium in the liquid state, and a dispersed state (suspension) in which a water-insoluble polymer is dispersed in an aqueous medium in the solid state.

In regard to the water-insoluble polymer according to exemplary embodiments of the invention, it is preferable that the water-insoluble polymer is a water-insoluble polymer adapted to be in a dispersed state in the solid state, from the viewpoints of rate of aggregation and fixation properties obtainable when incorporated in a liquid composition.

The method for preparing the emulsified or dispersed state of the self-dispersing polymer, that is, an aqueous dispersion of the self-dispersing polymer, may be a phase inversion emulsification method. The phase inversion emulsification method may be, for example, a method of dissolving or dispersing the self-dispersing polymer into a solvent (for example, a hydrophilic organic solvent or the like), subsequently introducing the solution or dispersion directly into water without adding a surfactant, mixing under stirring the system while a salt-producing group (for example, an acidic group) carried by the self-dispersing polymer is neutralized, removing the solvent, and then obtaining an aqueous dispersion that has been brought to an emulsified or dispersed state.

A stable dispersed state for particles of the self-dispersing polymer means that even when a solution prepared by dissolving 30 g of a water-insoluble polymer in 70 g of an organic solvent (for example, methyl ethyl ketone), a neutralizing agent adapted to neutralize 100% of the salt-producing group of the water-insoluble polymer (if the salt-producing group is anionic, sodium hydroxide, and if the salt-producing group is cationic, acetic acid), and 200 g of water are mixed and stirred (apparatus: a stirring apparatus equipped with a stirring blade, speed of rotation 200 rpm, for 30 minutes, 25° C.), and then the organic solvent is removed from the liquid mixture, it can be verified by visual inspection that the dispersed state remains stable for at least one week at 25° C.

Here, the term of water-insoluble polymer has the same definition as that defined in the item of dispersing agent.

The aqueous medium includes water as a component and, optionally, a hydrophilic organic solvent. In the present invention, the aqueous medium is preferably formed by water and a hydrophilic organic solvent whose amount is 0.2% by mass or less with respect to the amount of the water, and is more preferably formed only by water as a solvent.

The main chain backbone of the water-insoluble polymer is not particularly limited, and may be, for example, a vinyl polymer or a condensed polymer (such as an epoxy resin, polyester, polyurethane, polyamide, cellulose, polyether, polyurea, polyimide, or polycarbonate). Among them, a vinyl polymer is preferable.

Preferable examples of the vinyl polymer and the monomer or monomers for forming the vinyl polymer include those described in JP-A Nos. 2001-181549 and 2002-88294. A vinyl polymer may be used which has a dissociative group introduced to a terminal of the polymer chain; the dissociative group may be introduced by radical polymerization of a vinyl monomer using a chain transfer agent, polymerization initiator, or iniferter that has the dissociative group (or a substituent that can be converted to the dissociative group), or by ion polymerization using a compound having the dissociative group (or a substituent that can be converted to the dissociative group) as either of an initiator or a terminator.

Preferable examples of the condensed polymer and the monomers for forming the condensed polymer include those described in JP-A No. 2001-247787.

The particles of the self-dispersible polymer preferably contain a water-insoluble polymer containing a hydrophilic constituent unit and a constituent unit derived from an aromatic group-containing monomer from the viewpoint of self-dispersibility.

The hydrophilic constituent unit is not particularly limited so long as it is derived from a hydrophilic group-containing monomer and it may be either a unit derived from one hydrophilic group-containing monomer or a unit derived from two or more hydrophilic group-containing monomers. The hydrophilic group is not particularly limited and it may be either a dissociative group or a nonionic hydrophilic group.

In embodiments, the hydrophilic group is preferably a dissociative group from the viewpoints of promoting the self-dispersibility and stability of the formed emulsified or dispersed state and, more preferably, an anionic dissociative group. Examples of the dissociative group include a carboxy group, a phosphoric acid group, and a sulfonic acid group and, among them, a carboxy group is preferred from the viewpoint of the fixing property when used in the ink composition.

The hydrophilic group-containing monomer in the exemplary embodiment of the invention is preferably a dissociative group-containing monomer and, preferably, a dissociative group-containing monomer having a dissociative group and an ethylenically unsaturated bond from the viewpoints of self-dispersibility and aggregation properties.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-(methacryloyloxy)methyl succinicate, etc. Specific examples of the unsaturated sulfonic acid monomer include styrenesulfonic acid, 2-acrylamido-2-methylpropanesulfonic acid, 3-sulfopropyl(meth)acrylate, and bis(3-sulfopropyl)itaconate. Specific examples of the unsaturated phosphoric acid monomer include vinylphosphonic acid, vinylphosphate, bis(methacryloyloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, an unsaturated carboxylic acid monomer is preferred, a (meth)acrylic monomer is more preferred and, acrylic acid and methacrylic acid is particularly preferred from the viewpoints of the dispersion stability and ejection stability.

In a case where the self-dispersing polymer of the exemplary embodiment of the invention has an anionic dissociative group, the acid value of the self-dispersing polymer is preferably 200 mgKOH/g or less from the viewpoint of achieving satisfactory coagulation properties when an ink composition comes in contact with a treatment liquid. The acid value is more preferably from 25 mgKOH/g to 120 mgKOH/g, and still more preferably from 30 mgKOH/g to 80 mgKOH/g. When the acid value of the self-dispersing polymer is 25 mgKOH/g or more, the stability of the self-dispersibility is enhanced.

The aromatic-group-containing monomer is not particularly limited as long as the monomer is a compound containing an aromatic group and a polymerizable group. The aromatic group may be a group derived from an aromatic hydrocarbon or from an aromatic heterocycle. In the present invention, the aromatic group is preferably an aromatic group derived from an aromatic hydrocarbon, from the viewpoint of improving the stability of the particle shape in an aqueous medium.

The polymerizable group may be a condensation-polymerizable group or an addition-polymerizable group. In the present invention, the polymerizable group is preferably an addition-polymerizable group, and more preferably a group containing an ethylenically unsaturated bond, from the viewpoint of improving the stability of the particle shape in an aqueous medium.

The aromatic-group-containing monomer in the present invention is preferably a monomer having an aromatic group derived from an aromatic hydrocarbon and an ethylenically unsaturated bond. The aromatic-group-containing monomer may be used singly or in combination of two or more thereof.

Examples of the aromatic-group-containing monomer include phenoxyethyl(meth)acrylate, benzyl(meth)acrylate, phenyl(meth)acrylate, and a styrene-based monomer. In particular, from the viewpoint of improving the balance between the hydrophilicity and hydrophobicity of the polymer chain and ink fixability, an aromatic-group-containing (meth)acrylate monomer is preferable, and at least one selected from phenoxyethyl(meth)acrylate, benzyl(meth)acrylate, or phenyl(meth)acrylate is more preferable, and phenoxyethyl (meth)acrylate or benzyl(meth)acrylate are still more preferable.

The term "(meth)acrylate" used herein refers to acrylate or methacrylate.

The self-dispersing polymer in the present invention includes preferably an acrylic-based resin containing a structural unit derived from a (meth)acrylate monomer, and preferably an acrylic-based resin containing a structural unit derived from an aromatic group-containing (meth)acrylate monomer, and, furthermore, preferably contains a structural unit derived from aromatic group-containing (meth)acrylate monomer in the content range of from 10% by mass to 95% by mass. The content of the aromatic group-containing (meth)acylate monomer being from 10% by mass to 95% by mass may improve the stability in the emulsified or dispersed state and, furthermore, suppress the increase in the viscosity of the ink.

In the present invention, from the viewpoints of the stability in the self-dispersed state, the stabilization of particle configuration in an aqueous medium by the hydrophobic interaction among aromatic rings, and the decrease in the amount of aqueous components by the moderate hydrophobization of particles, the content is more preferably in a range of from 15% by mass to 90% by mass, and more preferably from 15% by mass to 80% by mass, and particularly preferably from 25% by mass to 70% by mass.

In the present invention, the self-dispersing polymer may include, for example, a structural unit derived from an aromatic-group-containing monomer and a structural unit derived from a dissociative-group-containing monomer. The self-dispersing polymer may further include another structural unit, as necessary.

The monomer for forming another structural unit is not particularly limited as long as the monomer is copolymerizable with the aromatic-group-containing monomer and the dissociative-group-containing monomer. In particular, an alkyl-group-containing monomer is preferable from the viewpoint of flexibility of the polymer skeleton and ease in regulating the glass transition temperature (Tg).

Specific examples of the monomer containing alkyl group(s) include (meth)acrylate-based monomers, (meth)acrylamide-based monomers, and the like. The (meth)acrylate-based monomers include alkyl(meth)acrylates such as methyl(meth)acrylate, ethyl(meth)acrylate, isopropyl(meth)acrylate, n-propyl(meth)acrylate, n-butyl(meth)acrylate, isobutyl(meth)acrylate, t-butyl(meth)acrylate, hexyl(meth)acrylate, and ethylhexyl(meth)acrylate; ethylenically unsaturated monomers containing a hydroxyl group such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, and hydroxyhexyl (meth)acrylate; dialkylaminoalkyl(meth)acrylates such as dimethylaminoethyl(meth)acrylate; and the like. The (meth)acrylamide-based monomers include N-hydroxyalkyl(meth)acrylamides such as N-hydroxymethyl(meth)acrylamide, N-hydroxyethyl(meth)acrylamide, and N-hydroxybutyl (meth)acrylamide; N-alkoxyalkyl(meth)acrylamides such as N-methoxymethyl(meth)acrylamide, N-ethoxymethyl (meth)acrylamide, N-(n-, iso-)butoxymethyl(meth)acrylamide, N-methoxyethyl(meth)acrylamide, N-ethoxyethyl (meth)acrylamide, and N-(n-, iso-)butoxyethyl(meth) acrylamide; and the like.

The molecular weight of the water-insoluble polymer which configures the self-dispersing polymer particles is preferably from 3000 to 200,000, more preferably from 5,000 to 150,000, and further preferably from 10,000 to 100,000, in terms of weight average molecular weight. When the weight average molecular weight is 3,000 or more, the amount of the water-soluble component can be effectively suppressed. When the weight average molecular weight is 200,000 or less, the self-dispersion stability can be enhanced.

The weight average molecular weight may be measured by a gel permeation chromatography (GPC).

HLC-8220 GPC (trade name, manufactured by Tosoh Corp.) is used for the GPC, and TSKGEL SUPER HZM-H, TSKGEL, SUPER HZ4000, and TSKGEL SUPER HZ2000 (trade names, all manufactured by Tosoh Corp., 4.6 mm ID×15 cm) are used as the columns and are connected in a series of three. The eluent liquid was THF (tetrahydrofuran). For the conditions, the sample concentration is 0.35% by mass, the flow rate is 0.35 mL/min, the amount of sample injection is 10 μL, the measurement temperature is 40° C., and an RI detector is used. A calibration curve is produced from 8 samples of the 2 standard sample TSK standard, "polystyrene": "F-40", "F-20", "F-4", "F-1", "A-5000", "A-2500", "A-1000" and "n-propylbenzene" (trade names) manufactured by Tosoh Corp.

When the water-insoluble polymer forming the self-dispersing polymer particles contains a structural unit derived from an aromatic-group-containing (meth)acrylate monomer (preferably a structural unit derived from phenoxyethyl (meth)acrylate and/or a structural unit derived from benzyl (meth)acrylate), the copolymerization ratio of the structural unit derived from an aromatic-group-containing (meth)acrylate monomer is preferably from 15 to 80% by mass with respect to the total mass of the self-dispersing polymer particles, from the viewpoint of regulating the hydrophilicity/hydrophobicity of the polymer.

The water-insoluble polymer, from the viewpoint of regulating the hydrophilicity/hydrophobicity of the polymer, preferably includes a structural unit derived from an aromatic-group-containing (meth)acrylate monomer at a copolymerization ratio of from 15 to 80% by mass, a structural unit derived from a carboxyl-group-containing monomer, and a structural unit derived from an alkyl-group-containing monomer (preferably a structural unit derived from an alkyl(meth)acrylate), and more preferably includes a structural unit derived from phenoxyethyl(meth)acrylate and/or a structural unit derived from benzyl(meth)acrylate at a total copolymerization ratio of from 15 to 80% by mass, a structural unit derived from a carboxyl-group-containing monomer, and a structural unit derived from an alkyl-group-containing monomer (preferably a structural unit derived from (meth)acrylic ester of an alkyl having 1 to 4 carbon atoms). Further it is preferable that the acid value of the water-insoluble polymer is from 25 to 100 (mg KOH/g) and the weight average molecular weight of the water-insoluble polymer is from 3,000 to 200,000, and it is more preferable that the acid value is from 25 to 95 (mg KOH/g) and the weight average molecular weight is from 5,000 to 150,000.

Hereinafter, specific examples of the water-insoluble polymer which configures the self-dispersing polymer particles will be listed as exemplary compounds, but the present invention is not limited, to these. The numbers in the parentheses represent the mass ratio of the copolymerized components.

B-01: Phenoxyethyl acrylate/methyl methacrylate/acrylic acid copolymer (50/45/5)

B-02: Phenoxyethyl acrylate/benzyl methacrylate/isobutyl methacrylate/methacrylic acid copolymer (30/35/29/6)

B-03: Phenoxyethyl methacrylate/isobutyl methacrylate/methacrylic acid copolymer (50/44/6)

B-04: Phenoxyethyl acrylate/methyl methacrylate/ethyl acrylate/acrylic acid copolymer (30/55/10/5)

B-05: Benzyl methacrylate/isobutyl methacrylate/methacrylic acid copolymer (35/59/6)

B-06: Styrene/phenoxyethyl acrylate/methyl methacrylate/acrylic acid copolymer (10/50/35/5)

B-07: Benzyl acrylate/methyl methacrylate/acrylic acid copolymer (55/40/5)

B-08: Phenoxyethyl methacrylate/benzyl acrylate/methacrylic acid copolymer (45/47/8)

B-09: Styrene/phenoxyethyl acrylate/butyl methacrylate/acrylic acid copolymer (5/48/40/7)

B-10: Benzyl methacrylate/isobutyl methacrylate/cyclohexyl methacrylate/methacrylic acid copolymer (35/30/30/5)

B-11: Phenoxyethyl acrylate/methyl methacrylate/butyl acrylate/methacrylic acid copolymer (12/50/30/8)

B-12: Benzyl acrylate/isobutyl methacrylate/acrylic acid copolymer (93/2/5)

B-13: Styrene/phenoxyethyl methacrylate/butyl acrylate/acrylic acid copolymer (50/5/20/25)

B-14: Styrene/butyl acrylate/acrylic acid copolymer (62/35/3)

B-15: Methyl methacrylate/phenoxyethyl acrylate/acrylic acid copolymer (45/51/4)

B-16: Methyl methacrylate/phenoxyethyl acrylate/acrylic acid copolymer (45/49/6)

B-17: Methyl methacrylate/phenoxyethyl acrylate/acrylic acid copolymer (45/48/7)

B-18: Methyl methacrylate/phenoxyethyl acrylate/acrylic acid copolymer (45/47/8)

B-19: Methyl methacrylate/phenoxyethyl acrylate/acrylic acid copolymer (45/45/10)

The method of producing the water-insoluble polymer forming the self-dispersing polymer particles in the present invention is not particularly limited, and may be a method including performing emulsion polymerization in the presence of a polymerizable surfactant so as to covalently couple the surfactant to the water-insoluble polymer or a method including copolymerizing a monomer mixture containing the hydrophilic-group-containing monomer and the aromatic-group-containing monomer by a known polymerization process such as a solution polymerization method or a bulk polymerization method. Among the above polymerization methods, a solution polymerization is preferable, and a solution polymerization method using an organic solvent is more preferable, in consideration of aggregation speed and ejection stability of an ink composition containing the self-dispersing polymer particles.

From the viewpoint of aggregation speed, the self-dispersing polymer in the present invention preferably includes a polymer synthesized in an organic solvent, wherein the polymer has carboxyl groups, all or some of the carboxyl groups of the polymer are neutralized (to give an acid value of preferably from 25 to 50), and the polymer is prepared in the form of a polymer dispersion in which water constitutes the continuous phase. In other words, the production of the self-dispersing polymer particles in the present invention preferably includes a step of synthesizing a polymer in an organic solvent and a dispersing step of forming an aqueous dispersion in which at least some of the carboxyl groups of the polymer are neutralized.

The dispersion step preferably includes the following sub-steps (1) and (2):

Sub-step (1): a step of stirring a mixture containing a polymer (water-insoluble polymer), an organic solvent, a neutralizing agent, and an aqueous medium Sub-step (2): a step of removing the organic solvent from the mixture The process (1) is preferably a treatment of first dissolving the polymer (water-insoluble polymer) in an organic solvent, slowly adding a neutralizing agent and an aqueous medium thereto, and mixing and stirring the mixture to obtain a dispersion. As such, when a neutralizing agent and an aqueous medium are added into a solution of the water-insoluble polymer dissolved in an organic solvent, a self-dispersing polymer particle having a particle size with higher storage stability can be obtained without requiring a strong shear force.

The method of stirring the mixture is not particularly limited, and any generally used mixing and stirring apparatus, or if necessary, a dispersing machine such as an ultrasonic dispersing machine or a high pressure homogenizer can be used.

Preferable examples of the organic solvent include alcohol-based solvents, ketone-based solvents, and ether-based solvents.

Examples of the alcohol-based solvents include isopropyl alcohol, n-butanol, t-butanol, ethanol and the like. Examples of the ketone-based solvents include acetone, methyl ethyl ketone, diethyl ketone, methyl isobutyl ketone, and the like. Examples of the ether-based solvents include dibutyl ether, dioxane, and the like. Among these solvents, ketone-based solvents such as methyl ethyl ketone and alcohol-based solvents such as isopropyl alcohol are preferred.

It is also preferable to use isopropyl alcohol and methyl ethyl ketone in combination so that the polarity change upon phase inversion from an oil system to an aqueous system becomes mild. When the solvents are used in combination, aggregation/precipitation or fusion between particles does not occur, and a self-dispersing polymer particle having a microparticle size with high dispersion stability can be obtained.

The neutralizing agent is used to partially or entirely neutralize the dissociative groups so that the self-dispersing polymer can form a stable emulsified or dispersed state in water. In the case where the self-dispersing polymer in exemplary embodiments of the invention has an anionic dissociative group (for example, a carboxyl group) as the dissociative group, examples of the neutralizing agent to be used include basic compounds such as organic amine compounds, ammonia, and alkali metal hydroxides. Examples of the organic amine compounds include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethyl-ethanolamine, 2-diethylamino-2-methyl-1-propanol, 2-amino-2-methyl-1-propanol, N-methyldiethanolamine, N-ethyldiethanolamine, monoisopropanolamine, diisopropanolamine, and triisopropanolamine, etc. Examples of the alkali metal hydroxide include lithium hydroxide, sodium hydroxide and potassium hydroxide. Among them, sodium hydroxide, potassium hydroxide, triethylamine, and triethanolamine are preferred from the viewpoint of the stabilization of dispersion of the self-dispersing polymer particles in exemplary embodiments of the invention into water.

These basic compounds are preferably used in an amount of from 5 mol % to 120 mol %, more preferably from 10 mol % to 110 mol %, and further preferably from 15 mol % to 100 mol %, based on 100 mol % of the dissociative group. When the content is 15 mol % or more, an effect of stabilizing the dispersion of particles in water is exhibited, and when the content is 100 mol % or less, an effect of reducing water-soluble components is obtained.

In the process (2), an aqueous dispersion of self-dispersing polymer particles can be obtained by distilling off the organic solvent from the dispersion obtained in the process (1) by a conventional method such as distillation under reduced pressure, to thereby bring about phase inversion into an aqueous system. The organic solvent in the obtained aqueous dispersion is substantially removed, and the amount of the organic solvent is preferably 0.2% by mass or less, and more preferably 0.1% by mass or less.

The average particle diameter of the self-dispersing polymer particle is, by volume average particle diameter, preferably in a range of from 1 nm to 70 nm, and more preferably from 2 nm to 60 nm, and even more preferably from 2 nm to 30 nm. When the volume average particle diameter is 2 nm or more, the ease of manufacturing of the self-dispersing polymer particle is improved, and when the volume average particle diameter is 70 nm or less, the local blocking resistance is improved.

In addition, the particle size distribution of the self-dispersing monomer particles is not particularly limited, and may be any one of a broad particle size distribution or a monodispersed particle size distribution. It is also possible to use a mixture of two or more kinds of water-insoluble polymer particles.

Meanwhile, the average particle diameter and the particle size distribution of the self-dispersing polymer particles are obtained by measuring volume average particle diameter by a dynamic light scattering method, using a Nanotrac particle size distribution measuring instrument UPA-EX 150 (trade name, manufactured by Nikkiso Co., Ltd.).

In addition, the glass transition temperature (Tg) of the self-dispersing polymer is preferably 70° C. or more, and more preferably 80° C. or more, and even more preferably 100° C. or more. When the glass transition temperature (Tg) is 70° C. or more, the local blocking resistance is improved. The upper limit of the glass transition temperature (Tg) is not particularly limited.

It is possible to use either one type of self-dispersing polymer particles or a mixture of two or more types of self-dispersing polymer particles.

The content of the self-dispersing polymer particles in the ink composition is preferably from 1 to 10% by mass, and more preferably from 1 to 5% by mass, with respect to the ink composition, from the viewpoint of aggregation speed, image gloss, and the like.

Explanation has been made above, taking the self-dispersible polymer particles as a preferable example of the polymer particles. However, the polymer particles are not limited to the self-dispersible polymer particles and other polymer particles can be used. For example, polymer particles, such as generally known emulsion polymerization latex, can also be preferably used by adjusting the constituent monomer, emulsifier, dispersion conditions, and the like.

Initiator

In embodiments, the ink composition may include at least one initiator that initiates polymerization of the polymerizable compound when irradiated with an actinic energy radiation. The initiator may be included in only the below-mentioned treatment liquid, or may be included in both of the ink composition and the treatment liquid, of the exemplary embodiment of the invention. The photopolymerization initiator may be used singly or in a mixture of two or more thereof. The photopolymerization initiator may be used together with a sensitizer.

The initiator may be appropriately selected from compounds that can initiate a polymerization reaction when irradiated with an actinic energy radiation, and examples thereof include an initiator, such as a photopolymerization initiator, that generates an active species (for example, a radical, an acid, or a base) when irradiated with a radiation or light or an electron beam.

Examples of the photopolymerization initiator include acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bisdiethylaminobenzophenone, Michler's ketone, benzil, benzoine, benzoin methyl ether, benzoin ethyl ether, benzoin isopropyl ether, benzoin n-propyl ether, benzoin isobutyl ether, benzoin n-butyl ether, benzil dimethyl ketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenyl ketone, 1-[4-(2-hydroxyethoxy)-phenyl]-2-hydroxy-2-methyl-1-propane-1-one, 2-hydroxy-2-methyl-1-phenyl-1-one, 1-(4-isopropylphenyl)-2-hydroxy-2-methylpropane-1-one, and methyl benzoyl formate. Further examples include an aromatic diazonium salt, an aromatic halonium salt such as diphenyliodonium hexafluoroantimonate, an aromatic sulfonium salt such as triphenylsulfonium hexafluorophosphate, and a metallocene compound.

When the ink composition includes an initiator, the content of the initiator in the ink composition may be from 1 to 40% by mass, and more preferably from 5 to 30% by mass, with respect to the amount of the polymerizable compound. When the content of the initiator is 1% by mass or more, the abrasion resistance of an image is further improved, which is preferable in high-speed recording. A content of the initiator of 40% by mass or less is preferable in terms of ejection stability.

Examples of the sensitizer include an amine-containing compound such as an aliphatic amine, an amine having an aromatic group, or piperidine; a urea such as an allyl-containing urea or o-tolylthiourea; a sulfur-containing compound such as sodium diethyl dithiophosphate or a soluble salt of an aromatic sulfinic acid; a nitrile-containing compound such as N,N-disubstituted p-aminobenzonitrile; a phosphorus-containing compound such as tri-n-butylphosphine or sodium diethyl dithiophosphate; a nitrogen-containing compound such as Michler's ketone, a N-nitrosohydroxylamine derivative, an oxazolidine compound, a tetrahydro-1,3-oxazine compound, or a condensate of a diamine with formaldehyde or acetoaldehyde; a chlorine-containing compound such as carbon tetrachloride or hexachloroethane; a high-molecular-weight amine that is a reaction product of an epoxy resin and an amine; and triethanolamine triacrylate.

The sensitizer may be contained so far as the effects of the present invention are not impaired.

Water

The ink composition includes water, and the content of water in the ink composition is not particularly limited. The content of water in the ink composition is preferably from 10 to 99% by mass, more preferably from 30 to 80% by mass, and still more preferably from 50 to 70% by mass.

Other Additives

The ink composition used in the present invention may further include other additives than the aforementioned components, such as known additives including a polymerization inhibitor, an anti-drying agent (moistener), an anti-fading agent, an emulsion stabilizer, a penetration enhancing agent, a UV absorber, an antiseptic agent, an mildew-proofing agent, a pH adjuster, a surface-tension controller, an antifoam agent, a viscosity adjuster, a dispersant, a dispersion stabilizer, an antirust agent and a chelating agent. When these additives are added to the ink composition, they are usually directly added to the ink composition. When a dispersion of an oil dye is used, these additives are usually added to the dispersion after the preparation of the dye dispersed. However, these additives may be added to an oil phase or aqueous phase during the preparation of the dye dispersion.

The use of the UV absorber may improve the storability of an image, and examples of the UV absorber include: benzotriazole compounds such as those described in JP-A Nos. 58-185677, 61-190537, 2-782, 5-197075 and 9-34057; benzophenone compounds such as those described in JP-A Nos. 46-2784, and 5-194483 and U.S. Pat. No. 3,214,463; cinnamic compounds such as those described in Japanese Patent Nos. 48-30492, and 56-21141 and JP-A No. 10-88106; triazine compounds such as those described in JP-A No. 4-298503, 8-53427, 8-239368, 10-182621 and Japanese Patent Application National phase Publication No. 8-501291; compounds described in Research Disclosure No. 24239; and so-called fluorescent brighteners that emit fluorescent light upon absorption of UV rays, such as stilbene compounds and benzoxazole compounds.

The anti-fading agent may be used for improving the storability of an image, and examples thereof include an organic anti-fading agent and a metal complex anti-fading agent. Examples of the organic anti-fading agent include hydroquinones, alkoxyphenols, dialkoxyphenols, phenols, anilines, amines, indanes, chromanes, alkoxyanilines and heterocyclic compounds. Examples of the metal complex anti-fading agent include nickel complexes and zinc complexes. More specifically, examples of usable antifading agents include those described in the patents cited in Research Disclosure No. 17643, Section VII, Items I to J; Research Disclosure No. 15162; No. 18716, page 650, left column; Research Disclosure No. 36544, page 527; No. 307105, page 872; Research Disclosure No. 15162; and compounds within the scope of the chemical formulae and examples of representative compounds described in pages 127 to 137 of JP-A No. 62-215272.

Examples of the mildew-proofing agents include sodium dehydroacetate, sodium benzoate, sodium pyridinethion-1-oxide, ethyl p-hydroxybenzoate, 1,2-benzoisothiazolin-3-one, and salts thereof. The content of the mildew-proofing agent is preferably from 0.02 to 1.00 mass % with respect to the ink composition.

Examples of the pH adjuster include a neutralizer such as an organic base or an inorganic alkali. The pH adjuster may improve the storability of the ink composition. The pH adjuster is preferably added at such an amount that the pH of the ink composition becomes from 6 to 10, more preferably from 7 to 10.

Example of the surface-tension controller include nonionic surfactants, cationic surfactants, anionic surfactants, and betaine surfactants.

The surface-tension controller is preferably added in such an amount that the surface tension of the ink composition is from 20 to 60 mN/m, more preferably from 20 to 45 mN/m, and further preferably from 25 to 40 mN/m. When the surface-tension controller is added in an amount in the above range, the ink composition may be spotted in a favorable manner using an inkjet method.

Specific examples of the surfactant as a hydrocarbon type preferably include anionic surfactants such as fatty acid salts, alkyl sulfuric acid ester salts, alkyl benzenesulfonates, alkyl naphthalenesulfonates, dialkyl sulfosuccinates, alkyl phosphoric acid ester salts, naphthalenesulfonic acid-formalin condensates and polyoxyethylene alkyl sulfuric acid salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. OLFINE (trade name, surfactant, manufactured by Nisshin Chemical Industry Co., Ltd.) and SURFYNOLS (trade name, products of Air Products & Chemicals) which are an acetylene type polyoxyethylene oxide surfactant) are preferably used. Furthermore, amine oxide type amphoteric surfactants such as N,N-dimethyl-N-alkyl amine oxide are preferred.

Additionally, materials described on pages (37) to (38) of JP-A No. 59-157636 and Research Disclosure No. 308119 (1989) as surfactants can be used.

When fluorocarbon (alkyl fluoride type) surfactants, silicone surfactants or the like, such as those described in JP-A Nos. 2003-322926, 2004-325707 and 2004-309806 are used, abrasion resistance can be improved.

The aforementioned surface-tension controller may also be used as an antifoam agent, and fluorine compounds, silicone compounds, chelate compounds such as EDTA are also applicable.

<Ink Set>

(Treatment Liquid)

The ink composition according to the present invention can be composed as ink set together with a treatment liquid containing an aggregating agent that aggregates the components in the ink composition. The treatment liquid contains at least an aggregating agent that aggregates the components in the above-mentioned ink composition, but can still optionally include the other components. By using the treatment liquid together with the ink composition, the inkjet recording can be speeded-up and, even when high speed recording is performed, an image excellent in terms of an image printing property (for example, reproducibility of thin lines or fine portions in the image) with high density and high resolution can be obtained.

The coagulant may be a compound that can change the pH value of the ink composition, a polyvalent metal salt, or a polymer having a quaternary amine or a tertiary amine such as polyallylamines. In the present invention, a compound that can change the pH value of the ink composition is preferable, and a compound that can decrease the pH value of the ink composition is more preferable, from the viewpoint of coagulation properties of the ink composition.

As the compound lowering the pH of the ink composition, an acidic material is exemplified. Preferable examples of the acidic material include sulfuric acid, hydrochloric acid, nitric acid, phosphoric acid, polyacrylic acid, acetic acid, glycoric acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrole carboxylic acid, furan carboxylic acid, pyridine carboxylic acid, coumalic acid, thiophene carboxylic acid, nicotinic acid, or derivatives of such compound or salts thereof. One of these acidic materials may be used alone or two or more thereof may be used together.

In the present invention, when the treatment liquid includes an acidic substance, the pH value of the treatment liquid at 25° C. is preferably 6 or less, and more preferably 4 or less. In particular, the pH value of the treatment liquid at 25° C. is preferably from 1 to 4, and particularly preferably from 1 to 3. In such a case, the pH value of the ink composition at 25° C. is preferably 7.5 or more, and more preferably 8.0 or more.

In particular, it is preferable that the pH value of the ink composition at 25° C. is 8.0 or more and the pH value of the treatment liquid at 25° C. is from 0:5 to 4, from the viewpoint of image density, resolution, and higher-speed inkjet recording.

In the present invention, the coagulant is preferably an acidic substance having high solubility with respect to water, and is preferably an organic acid from the viewpoints of increasing coagulation properties and immobilizing the entire ink. The coagulant is more preferably a divalent or higher-valent organic acid, and still more preferably a divalent or trivalent acidic substance. The divalent or higher-valent organic acid is preferably an organic acid having a first pKa of 3.5 or less, and more preferably an organic acid having a first pKa of 3.0 or less. Examples thereof include phosphoric acid, oxalic acid, malonic acid, and citric acid.

Examples of the polyvalent metal salt and a polyallyl amine include salts of alkaline earth metals belonging to group 2 of the periodic table (for example, magnesium and calcium), salts of a transition metal belonging to group 3 of the periodic table (for example, lanthanum), salts of a cation of a metal belonging to group 13 of the periodic table (for example, aluminum), salts of a lanthanide (for example, neodium). As the metal salts, carboxylic acid salts (such as, salts of formic acid, salts of acetic acid, and salts of benzoic acid), nitric acid salts, chlorides, and thiocyanic acid salts are preferred, and calcium salts or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid or magnesium salt of thiocyanic acid are more preferred.

The coagulant may be used singly, or in combination of two or more thereof.

The content of the coagulant, which coagulates the ink composition, in the treatment liquid is preferably from 1 to 50% by mass, more preferably from 3 to 45% by mass, and still more preferably from 5 to 40% by mass.

The treatment liquid may include other additives as additional components, as long as the effects of the present invention are not impaired. Examples of other additives include known additives, such as an anti-drying agent (moistening agent), an anti-fading agent, an emulsion stabilizer, a penetration enhancing agent, a UV absorber, an antiseptic agent, an mildew-proofing agent, a pH adjuster, a surface-tension controller, an antifoam agent, a viscosity adjuster, a dispersant, a dispersion stabilizer, an antirust agent, and a chelating agent.

<Image Forming Method>

The inkjet image forming method of one aspect of the invention include discharging, onto a recording medium, the ink composition through an inkjet head (Preferably, an inkjet head having a silicone nozzle plate), to form an image. The inkjet image forming method may further include one or more other process(es).

In embodiments, the inkjet image forming method may preferably further include applying, onto the recording medium, a treatment liquid which is adapted to form an aggregate when contacted with the ink composition.

In the exemplary embodiment of the invention using the polymer particles, the ink composition for forming an ink image includes polymer particles and a water-soluble polymerizable compound that can be cured through polymerization, together with a pigment. Due to this configuration, an image is immobilized by a coagulation reaction of the pigment and/or the polymer particles when the ink composition contacts the treatment liquid. Further, the polymer particles are present between particles of the pigment, and the polymerizable compound, which is in the state of being incorporated into a space among such particles in the immobilized image, is cured through polymerization, whereby the strength of the final image is increased. In other words, using the treatment liquid, components in the ink composition are coagulated rapidly to prevent intermixing of ink droplets, such as bleeding or intercolor mixing, and, as a result, suitability for high-speed recording and effects in improving the hue and image printing properties (including reproducibility of thin lines and minute portions in an image) during high-speed recording are imparted, while the polymerizable compound enters, to an appropriate extent, into a space among the pigment particles and the polymer particles that are in a coagulated state. Since the polymerizable compound is cured through polymerization and in this state, the image strength can be improved, and both suitability for high-speed recording and improvement in the abrasion resistance of an image can be achieved.

In particular, these effects are more conspicuous when image recording is performed on a coated paper as a recording medium having a surface at which the pigment tends to remain.

Each process in the image forming method of the exemplary embodiment of the invention will be explained below.

-Ejection of Ink Composition-

In the process of discharging of the ink composition, the ink composition is applied from an inkjet head having a silicone nozzle plate onto a recording medium by inkjet method. This process may enable to selectively apply the ink composition to the recording medium to form a desired image. Details and preferable embodiments of components of the ink composition are described above.

Image recording utilizing the inkjet method can be performed, specifically, by supplying energy thereby ejecting a liquid composition to a desired recording medium, that is, plain paper, resin-coated paper, paper used exclusively for inkjet recording described, for example, in JP-A Nos. 8-169172, 8-27693, 2-276670, 7-276789, 9-323475, 62-238783, 10-153989, 10-217473, 10-235995, 10-217597, and 10-337947, films, common use paper for electrophotography, clothes, glass, metals, ceramics, etc. As the inkjet recording method suitable to exemplary embodiments of the invention, a method described in JP-A No. 2003-306623, in columns (0093) to (0105) may be applicable.

The inkjet method is not particularly limited and may be of any known system, for example, a charge control system of ejecting an ink utilizing an electrostatic attraction force, a drop on demand system of utilizing a vibration pressure of a piezo element (pressure pulse system), an acoustic inkjet system of converting electric signals into acoustic beams, irradiating them to an ink, and ejecting the ink utilizing a radiation pressure, and a thermal inkjet system of heating an ink to form bubbles and utilizing the resultant pressure (BUBBLEJET (registered trade mark)). Examples of the inkjet method include a system of injecting a number of ink droplets of low concentration, a so-called "photo-ink" each in a small volume, a system of improving an image quality using plural inks of a substantially identical hue and of different concentrations, and a system of using a colorless transparent ink.

The inkjet head used in the inkjet method may be either an on-demand system or a continuous system. The ejection system includes, specifically, for example, an electric-mechanical conversion system (for example, single cavity type, double cavity type, bender type, piston type, share mode type, and shared wall type, etc.), an electric-thermal conversion system (for example, thermal inkjet type, BUBBLEJET (registered trade mark) type, etc.), an electrostatic attraction system (for example, electric field control type, and slit jet type, etc.), and an electric ejecting system (for example, spark jet type, etc.) and any of the ejection systems may be used.

Ink nozzles, etc. used for recording by the inkjet method are not particularly limited but can be selected properly depending on the purpose.

Examples of the inkjet method include an inkjet head of a shuttle system in which a short serial head is used and recording is performed while allowing the head to scan in the lateral direction of a recording medium, and an inkjet head of a line system in which a line head in which recording elements are arranged corresponding to the entire region for one side of a recording medium is used. In the line system, an image can be recorded over the entire surface of the recording medium by allowing the recording medium to be scanned in the direction being at right angles to the direction of arranging the recording elements, in which a transportation system such as a carriage by which the short head moves for scanning is not necessary. Further, since complicated scanning control for the movement of the carriage and the recording medium is not necessary and only the recording medium is moved, higher recording speed can be attained as compared with the shuttle system. While the inkjet recording method in exemplary embodiments of the invention is applicable to any one of them, the effect of improving the ejection accuracy and the abrasion resistance of the image is generally remarkable when the inkjet recording method is applied to the line system without performing dummy jetting.

The amount of ink droplet of the ink ejected from the inkjet head is preferably 0.5 pL (picoliter) to 6 pL, more preferably 1 pL to 5 pL and further preferably 2 pL to 4 pL, from the viewpoint of obtaining high accuracy images.

(Inkjet Head Having Silicone Nozzle Plate)

The inkjet head employed in the image forming method has a nozzle plate. At least a part of the nozzle plate preferably contains silicone. FIG. 1 is a schematic diagram showing one example of an internal structure of the inkjet head.

FIG. 1 shows an inkjet head 100 having a nozzle plate 11 and an ink supplying unit 20 which is provided on a opposite side from the ink ejecting direction of the nozzle plate. The nozzle plate 11 has plural ejection openings 12 through which inks are ejected.

Figure 2:
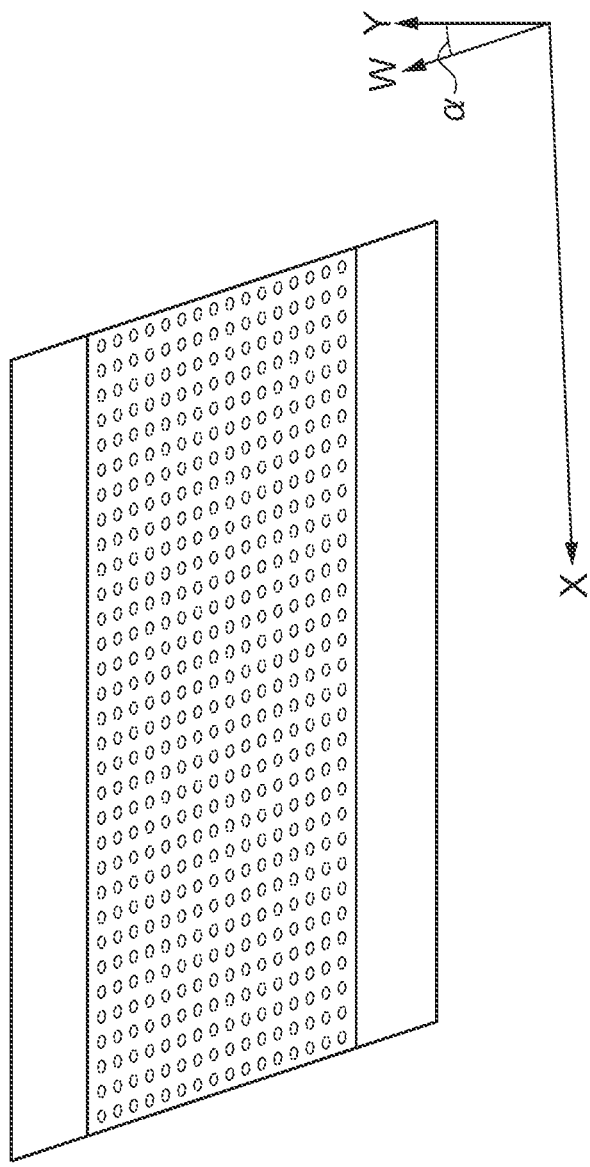
FIG. 2 is a schematic diagram showing one example of an alignment of ejection openings on a nozzle plate.

FIG. 2 shows a two-dimensional alignment of 32×60 ejection openings (nozzles) provided with the nozzle plate 11. At least a part of the nozzle plate is formed from silicone. The silicone is exposed at an inner wall of an opening of each nozzle and a surface of the nozzle plate 11 which resides at a side to which direction the ink composition is ejected. A liquid-repellant film, which is not shown in the Figures, is provided at least a part of the surface of the nozzle plate 11 which resides at an ink ejecting direction side.

The ink supply unit 20 is equipped with plural pressure chambers 21, each of which communicates with each of the plural ejection openings 12 of the nozzle plate 11 through the nozzle communication path 22, plural ink supplying paths 23 that supply ink to each of the plural pressure chambers 21, a common liquid chamber 25 that supplies ink to the plural ink supplying paths 23, and a pressure generation unit 30 that transforms each of the plural pressure chambers 21.

The ink supplying paths 23 locate between the nozzle plate 11 and the pressure generating unit 30 and an ink which has been supplied to the common liquid chamber 25 is introduced to the ink supplying path 23. One terminal of a supply regulating path 24 which is connected with the pressure chambers 21 is connected to the ink supplying path 23 so that an amount of an ink supplied from the ink supplying path 23 to the pressure chamber 21 may be regulated to be a desired one. This system may enable to supply a plenty of amount of ink to the plural ejection openings.

The pressure generating unit 30 has a configuration in which a vibration plate 31, an adhesion layer 32, a lower electrode 33, a piezoelectric layer 34, and an upper electrode 35 are provided in this order from the side at which the pressure chamber 21 resides. An electric wiring which supplies driving signal from outside is connected to the pressure generating unit 30. Transformation of the piezoelectric device which is caused in accordance with the driving signal leads ejection of an ink from the ejection opening 12 of the nozzle through the nozzle communication path 22.

A circulation aperture 41 which continuously collects an ink to a circulation path 42 is provided in the vicinity of the ejection opening 12. Increase of viscosity of an ink in the vicinity of the ejection opening during non-driving period may be suppressed thereby.

-Treatment Liquid Applying Step-

The treatment liquid applying step performs imaging by applying a treatment liquid configured to form aggregates when contacted with the ink composition, to a recording medium, and placing the treatment liquid in contact with an ink composition. In this case, dispersed particles of the polymer particles or color materials (for example, pigments) in the ink composition aggregate, and an image is fixed to the recording medium. In addition, the details and preferred embodiments of the respective components in the treatment liquid are as described previously.

Application of the treatment liquid may be performed by applying known methods such as a coating method, an inkjet method, and an immersion method. The coating method may be performed by a known coating method using a bar coater, an extrusion die coater, an air doctor coater, a bread coater, a rod coater, a knife coater, a squeeze coater, or a reverse roll coater. Details of the inkjet method are as described above.

The treatment liquid discharging step may be provided before or after the ink applying step using the ink composition.

In the invention, an embodiment in which the ink discharging step is provided after the treatment liquid is applied in a treatment liquid applying step, is preferable. That is, an embodiment in which, before discharging the ink composition onto the recording medium, a treatment liquid for aggregating a color material (preferably, pigments) in the ink composition is applied in advance, and the ink composition is applied so as to contact the treatment liquid applied on the recording medium to form an image, is preferable. Thereby, inkjet recording may be speeded-up and, even when high speed recording is performed, an image having high density, and high resolution is obtained.

The amount of application of the treatment liquid is not particularly limited so long as the liquid can aggregate the ink composition, but can be an amount resulting in an amount of application of the aggregated component (for example, a carboxylic acid or a cationic organic compound having a valency of 2 or greater) of 0.1 g/m$^2$ or more. Among them, an amount resulting in an amount of application of the aggregated component of 0.1 to 1.0 g/m$^2$ is preferred, and an amount resulting in 0.2 to 0.8 g/m$^2$ is more preferred. When the amount of application of the aggregated component is 0.1 g/m$^2$ or more, the aggregation reaction proceeds satisfactorily, and when the amount is 1.0 g/m$^2$ or less, the glossiness is not very high, and is preferable.

According to exemplary embodiments of the invention, it is preferable to provide an ink discharging step after the treatment liquid applying step, and to further provide a heating drying step of heating and drying the treatment liquid on the recording medium, between the time after applying the treatment liquid onto the recording medium, and the time until the ink composition is applied. By heating and drying the treatment liquid previously before the ink discharging step, ink coloring properties such as the prevention of spreading becomes good, and visible images having good color density and hue can be recorded.

The heating and drying can be carried out by a known heating means such as heater, an air blowing means utilizing air blowing such as dryer, or a means combining these. Examples of the heating method include a method of supplying heat by a heater or the like, from the surface of the recording medium opposite the surface applied with the treatment liquid, a method of blowing a warm air or hot air to the surface of the recording medium applied with the treatment liquid, a method of heating using an infrared heater, or the like. Heating can also be performed by combining these methods.

-Heating Fixing Step-

It is preferable that the image forming method in exemplary embodiments of the invention includes, after the ink applying step, a heating fixing step for heating and fixing the ink image formed by the application of the ink composition by placing the image in contact with a heated surface. By adding a heating fixing treatment, fixing of the image on the recording medium is achieved, and the resistance of the images to abrasion can be further enhanced.

The heating method is not particularly limited, but methods of non-contact drying such as a method of heating with a heat generator such as a nichrome wire heater; a method of supplying warm air or hot air; and a method of heating with a halogen lamp, an infrared lamp or the like, may be suitably exemplified. The method of heating and pressing is not particularly limited, but methods of performing heating and fixing by contact such as, for example, a method of pressing a heat plate to the image-formed surface of the recording medium, and a method of passing the image through a pair of rollers using a heating and pressing apparatus equipped with a pair of heating and pressing rollers, a pair of heating and pressing belts, or a heating and pressing belt disposed on the side of the image-recorded surface of the recording medium and a retaining roller disposed on the opposite side, may be suitably mentioned.

-Actinic Energy Ray Irradiation Process-

The image forming method according to the present invention preferably provides an actinic energy ray irradiation process. The actinic energy ray irradiation process refers to a process that irradiates, for example, ultraviolet rays from an ultraviolet irradiation lamp on an ink image formed by ejecting the ink composition. Thereby, monomer components at the image can be cured reliably through polymerization. In this case, the ultraviolet irradiation lamp is arranged to face to the recording face of the recording medium and irradiates on the entire recording face, the entire image can be cured. Meanwhile, the light source that irradiates actinic energy ray is not limited to an ultraviolet irradiation lamp, and can include, for example, a halogen lamp, a high-pressure mercury vapor lamp, a laser, an LED, and an electron ray irradiation device.

The actinic energy ray irradiation process may be performed at either of before and after the heating drying process so long as being performed after the ink discharging process and the treatment liquid applying process, and also may be performed at both of before and after the heating drying process.

The wavelength of the actinic energy ray is, for example, preferably from 200 nm to 600 nm, and more preferably from 300 nm to 450 nm, and even more preferably from 350 nm to 420 nm.

The output of the actinic energy ray is preferably 5000 mJ/cm$^2$ in the integrated irradiance, and more preferably from 10 mJ/cm$^2$ to 4000 mJ/cm$^2$, and even more preferably from 20 mJ/cm$^2$ to 3000 mJ/cm$^2$.

-Recording Medium-

The image forming method in exemplary embodiments of the invention is to record an image on the recording medium.

The recording medium is not particularly limited, and general printing paper containing cellulose as a main component such as so-called high-quality paper, coated paper, and art paper may be used. The general printing paper containing cellulose as a main component absorbs and dries an ink relatively slowly, easily causes coloring material movement after a droplet is spotted, and allows image quality to easily deteriorate in image recording by a general inkjet method using an aqueous ink. However, according to the inkjet recording method in exemplary embodiments of the invention, coloring material movement is suppressed, and a high-quality image excellent in color density and hue may be recorded.

As the recording medium, a recording medium which is generally commercially available may be used, and examples include high quality paper such as OK Prince High Quality (trade name, manufactured by Oji Paper Co., Ltd.), Shiraoi (trade name, manufactured by Nippon Paper Industries Co., Ltd.), and New NP High Quality (trade name, manufactured by Nippon Paper Industries Co., Ltd.), fine coated paper such as OK Ever Lite Coat (trade name, manufactured by Oji Paper Co., Ltd.) and Aurora S (trade name, Nippon Paper Industries Co., Ltd.), light coated paper (A3) such as OK Coat L (trade name, manufactured by Oji Paper Co., Ltd.) and Aurora L (trade name, manufactured by Nippon Paper Industries Co., Ltd.), coated paper (A2, B2) such as OK Top Coat+(trade name, manufactured by Oji Paper Co., Ltd.) and Aurora Coat (trade name, manufactured by Nippon Paper Industries Co., Ltd.), and an art paper (A1) such as OK Kanefuji+(trade name, manufactured by Oji Paper Co., Ltd.) and Tokubishi Art (trade name, manufactured by Nippon Paper Industries Co., Ltd.). Further, various papers for photography for use in inkjet recording may be used.

Among them, from the viewpoint of that the effect of suppressing coloring material movement is great, and a high quality image having better color density and hue than the previous ones is obtained, a recording medium having a water absorption coefficient Ka of 0.05 $mL/m^2 \cdot ms^{1/2}$ to 0.5 $mL/m^2 \cdot ms^{1/2}$ is preferable, a recording medium having the water absorption coefficient Ka of 0.1 $mL/m^2 \cdot ms^{1/2}$ to 0.4 $mL/m^2 \cdot ms^{1/2}$ is more preferable, and a recording medium having the water absorption coefficient Ka of 0.2 $mL/m^2 \cdot ms^{1/2}$ to 0.3 $mL/m^2 \cdot ms^{1/2}$ is further preferable.

The water absorption coefficient Ka has the same meaning as described in JAPAN TAPPI, Pulp test method No. 51: 2000 (published by JAPAN TAPPI), and specifically, the absorption coefficient Ka is calculated from the difference in the amount of transfer of water at a contact time of 100 ms and a contact time of 900 ms, using an automatic scanning absorptometer KM500Win (manufactured by Kumagai Riki Kogyo Co., Ltd.).

Among the recording media, a so-called coated paper used in general offset printing is preferred. The coated paper is a product obtained by coating with a coating material the surface of a paper such as a high quality paper or neutral paper which is mainly based on cellulose and is not surface treated. The coated paper is likely to cause problems in product quality such as the gloss or abrasion resistance of images, in the conventional image formation by aqueous inkjet recording, but in the inkjet recording method in exemplary embodiments of the invention, gloss irregularity is suppressed, and images having good glossiness and abrasion resistance are obtained. Particularly, it is preferable to use a coated paper having a base paper and a coating layer containing kaolin and/or calcium bicarbonate. More specifically, art paper, coated paper, lightweight coated paper or finely coated paper is more preferred.

EXAMPLES

Hereinafter, the present invention will be specifically described with reference to Examples, but the present invention is not limited to these Examples, as long as not to be exceeded the gist of the present invention. Unless stated otherwise, the "parts" and "%" are based on mass.

The weight average molecular weight was measured by a gel permeation chromatography (GPC).

HLC-8220 GPC (trade name, manufactured by Tosoh Corp.) was used for the GPC, and TSKGEL SUPER HZM-H, TSKGEL SUPER HZ4000, and TSKGEL SUPER HZ2000 (trade names, all manufactured by Tosoh Corp.) were used as the columns and were connected in a series of three. The eluent liquid was THF (tetrahydrofuran). For the conditions, the sample concentration was 0.35% by mass, the flow rate was 0.35 mL/min, the amount of sample injection was 10 μL, the measurement temperature was 40° C., and an RI detector was used. A calibration curve was produced from 8 samples of the 2 standard sample TSK standard, "polystyrene": "F-40", "F-20", "F-4", "F-1", "A-5000", "A-2500", "A-1000" and "n-propylbenzene" (trade names) manufactured by Tosoh Corp.

<Preparation of Ink Composition>
(Synthesis of Water-Insoluble Polymer Dispersant P-1)

88 g of methyl ethyl ketone was placed in a 1000-mL three-necked flask equipped with a stirrer and a cooling tube, and heated to 72° C. in a nitrogen atmosphere. Into the flask, A solution prepared by dissolving 0.85 g of dimethyl 2,2'-azobisisobutyrate, 50 g of phenoxyethyl methacrylate, 13 g of methacrylic acid, and 37 g of methyl methacrylate in 50 g of methyl ethyl ketone was added dropwise to the flask over a period of 3 hours. After completion of the addition, the reaction was continued for further one hour, and then a solution prepared by dissolving 0.42 g of dimethyl 2,2'-azobisisobutyrate in 2 g of methyl ethyl ketone was added into the flask, and the solution was heated at 78° C. for 4 hours. The reaction solution thus obtained was reprecipitated twice in an excess amount of hexane, and the precipitated resin was dried to obtain 96.5 g of a phenoxyethyl methacrylate/methyl methacrylate/methacrylic acid (copolymerization ratio [% by mass]=50/37/13) copolymer (resin dispersant P-1).

The composition of the resin dispersant P-1 thus obtained was confirmed by $^1$H-NMR. The weight average molecular weight (Mw) thereof determined by GPC was 49400. The acid value thereof determined by the method described in Japanese Industrial Standard (JIS K 0070:1992), the disclosure of which is entirely incorporated by reference herein, was 84.8 mgKOH/g.

(Preparation of Color Material Particle Dispersion C)

10 parts of pigment blue 15:3 (Phthalocyanine blue-A220, trade name, manufactured by Dainichiseika Color & Chemicals Mfg. Co., Ltd.; cyan pigment), 4 part of the polymer dispersing agent P-1, 42 parts of methyl ethyl ketone, 4.4 parts of 1 mol/L NaOH aqueous solution, and 87.2 parts of ion-exchanged water were mixed and then dispersed for 2 to 6 hours by a beads mill using 0.1 mmϕ zirconia beads.

After removing the methyl ethyl ketone at 55° C. under reduced pressure and, furthermore, removing some water, a centrifugal treatment was performed on the obtained dispersion at 8000 rpm for 30 minutes by using a high-speed centrifugal cooling machine 7550 (trade name, manufactured by Kubota Corporation) and a 50 mL centrifugal tube to recover supernatant solutions other than precipitates. Thereafter, pigment concentration was obtained from the absorbance spectrum, and the color material particle dispersion C as a dispersion of resin-coated pigment particles (encapsulated pigment) with the pigment concentration of 10.2% by mass was obtained.

Synthesis of Particles of Self-dispersing Polymer (Specific Compound B-01)

360.0 g of methyl ethyl ketone was placed in a 2 L three-necked flask equipped with a stirrer, a thermometer, a reflux condenser, and a nitrogen gas introduction tube, and was heated to 75° C. Thereafter, while the temperature inside the flask was maintained at 75° C., a mixture solution of 180.0 g of phenoxyethyl acrylate, 162.0 g of methyl methacrylate, 18.0 g of acrylic acid, 72 g of methyl ethyl ketone, and 1.44 g of V-601 (trade name, manufactured by Wako Pure Chemical Industries Ltd.) was added dropwise into the flask at a constant rate such that the dropwise addition was completed in 2 hours. After the dropwise addition was completed, a solution of 0.72 g of V-601 in 36.0 g of methyl ethyl ketone was added into the flask, stirred at 75° C. for 2 hours, and a solution of 0.72 g of V-601 in 36.0 g of isopropanol was further added, and the contents of the flask were stirred at 75° C. for 2 hours. Then, the temperature inside the flask was increased to 85° C., and stirring was continued for another 2 hours. As a result, a resin solution of a copolymer of phenoxyethyl acrylate/methyl methacrylate/acrylic acid (in a ratio of 50/45/5 by mass) was obtained.

The weight average molecular weight (Mw) of the obtained copolymer as measured in a similar manner to the above was 64,000 (calculated as polystyrene-equivalent value according to gel permeation chromatography (GPC)). The acid value of the copolymer was found to be 38.9 mgKOH/g.

Then, 668.3 g of the obtained resin solution was weighed, and 388.3 g of isopropanol and 145.7 ml of a 1 mol/L NaOH aqueous solution were added to the resin solution, and then the temperature inside the reaction vessel was elevated to 80° C. Thereafter, 720.1 g of distilled water was added dropwise into the reaction vessel at a rate of 20 ml/min so as to form a water dispersion. The contents of the reaction vessel was allowed to stand, under atmospheric pressure, at a reaction vessel inside temperature of 80° C. for 2 hours, and then 85° C. for 2 hours, and then 90° C. for 2 hours. Subsequently, the pressure inside the reaction vessel was reduced, and the isopropanol, the methyl ethyl ketone, and the distilled water were removed in a total amount of 913.7 g. As a result, a water dispersion of self-dispersing polymer particles (Specific compound B-01) having a solid concentration of 28.0% by mass was obtained.

(Synthesis of Polymerizable Compound 1)

40.0 g (182 mmol) of 4,7,10-trioxa-1,13-tridecanediamine, 37.8 g (450 mmol) of sodium hydrogen carbonate, 100 g of water, and 300 g of tetrahydrofuran were added to a 1 L three-necked flask equipped with a stirrer, and 35.2 g (389 mmol) of acrylic acid chloride was added dropwise using an ice bath over 20 minutes. After the dropwise addition, 5 hour-long stirring was performed at room temperature, and then the tetrahydrofuran was removed by distillation from the obtained reaction mixture under reduced pressure. Then, the water layer was extracted four times each with 200 mL of ethyl acetate, and the organic layer obtained was dried with magnesium sulfate, and then filtration was performed, and the solvent was removed by distillation under reduced pressure, and thereby 35.0 g (107 mmol, yield 59%) of the targeted solid polymerizable compound 1 was obtained.

(Preparation of the Ink Composition for an Inkjet Use)

~Ink Composition C-2~

Each component of the color material particle dispersion C obtained in the above step, self-dispersing polymer particles (Specific compound B-01), polymerizable compound 1, and sodium silicate were mixed so as to become the below-mentioned ink composition. This was sealed in a disposable plastic cylinder and filtered with a PVDF 5 nm filter (MILLERX-SV, 25 mm in diameter, trade name, manufactured by Millipore Corporation) so as to produce a cyan ink C-2 (an ink composition for an inkjet use).

~Ink Composition~

| | |
|---|---|
| Color material particle dispersion C | 29.4% |
| Water dispersion solid content of the self-dispersing polymer fine particle (B-01) | 2% |
| Polymerizable compound 1 (with the following structure) | 15% |
| Diethylene glycol monoethyl ether (DEGMEE) | 1% |
| (trade name, manufactured by Wako Pure Chemical Industries Ltd.) | |
| Sodium silicate (solid content) | 1.5% |
| (Sodium silicate solution (water glass, solid content concentration of 55%, manufactured by Wako Pure Chemical Industries Ltd.)) | |
| OLFINE E1010 (trade name, manufactured by Nissin Chemical Co., Ltd.) | 1% |
| Polymerization initiator (IRGACURE 2959) (trade name, manufactured by Ciba Japan, Inc.) | |
| Ion-exchanged water . . . remaining amount (added to make the total amount 100% by mass). | |

Polymerizable compound 1

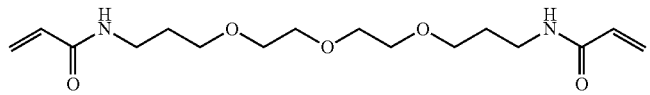 [SMILES: C=CC(=O)NCCCOCCOCCOCCCNC(=O)C=C]

~Ink Compositions C-1, and C-3 to C-13~

Cyan inks C-1 and C-3 to C-13 were prepared respectively in a manner substantially similar to the preparation of the above-mentioned cyan ink C-2 except that, instead of the polymerizable compound 1, the polymerizable compounds shown in the Table 1 below were used, and the kinds and added amounts of water-soluble silicate were varied respectively as shown in the Table 1 below.

TABLE 1

| Ink Name | Water-soluble Polymerizable Compounds Kind | Water-soluble Polymerizable Compounds Added amount (% by mass) | Water-soluble Silicate Kind | Water-soluble Silicate Added Amount (% by mass) | Mass Ratio Silicate/Water-soluble Polymerizable Compound (% by mass/% by mass) | Comments |
|---|---|---|---|---|---|---|
| C-1 | Compound 5 | 3 | (Colloidal Silica (SNOW-TEX C; trade Name)) * 1 | 0.5 | — | Comparative Example |
| C-2 | Compound 1 | 15 | Sodium Silicate | 1.5 | 0.1 | Present Invention |
| C-3 | Compound 1 | 15 | Sodium Silicate | 0.5 | 0.03 | Present Invention |
| C-4 | Compound 1 | 15 | Sodium Silicate | 0.01 | 0.00067 | Present Invention |
| C-5 | Compound 1 | 15 | Sodium Silicate | 0.001 | 0.000067 | Present Invention |
| C-6 | Compound 1 | 15 | Sodium Silicate | 0.0001 | 0.0000067 | Present Invention |
| C-7 | Compound 1 | 15 | Sodium Silicate | 0.00001 | 0.00000067 | Present Invention |
| C-8 | Compound 2 | 15 | Sodium Silicate | 0.01 | 0.00067 | Present Invention |
| C-9 | Compound 3 | 15 | Sodium Silicate | 0.01 | 0.00067 | Present Invention |
| C-10 | Compound 4 | 15 | Sodium Silicate | 0.01 | 0.00067 | Present Invention |
| C-11 | Compound 5 | 15 | Sodium Silicate | 0.01 | 0.00067 | Present Invention |
| C-12 | Compound 1 | 15 | Tetramethyl ammonium silicate | 0.01 | 0.00067 | Present Invention |
| C-13 | Compound 1 | 15 | Potassium silicate | 0.01 | 0.00067 | Present Invention |

* 1 Colloidal silica that does not correspond to water-soluble silicate was added as a substitution.

Meanwhile, the following is the structures of the polymerizable compounds and the details of the colloidal silica shown in Table 1.

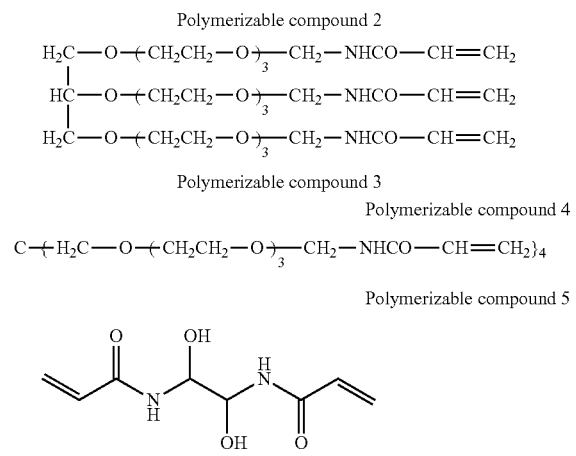

Polymerizable compound 2

Polymerizable compound 3

Polymerizable compound 4

Polymerizable compound 5

Polyethylene glycol diacrylate (A-400; trade name, manufactured by Shin-Nakamura Chemical Co., Ltd.)

The polymerizable compound 2 and the polymerizable compound 3 can be synthesized based on the polymerizable compound 1.

Colloidal silica (comparative compound (which does not correspond to the water-soluble silicate)) . . . SNOW-TEX C, trade name, solid content concentration of 20%, manufactured by Nissan Chemical Industry Co., Ltd.

<Preparation of the Treatment Liquid>

The treatment liquid was manufactured as follows:

(Preparation of Treatment Liquid 1)

The components of the following composition were mixed to prepare Treatment liquid 1. The viscosity, surface tension and pH (25° C.) of Treatment liquid 1 were 2.5 mPa·s, 40 mN/m, and 1.0, respectively. The surface tension was measured using a full automatic surface tensiometer CBVP-Z, trade name, manufactured by Kyowa Interface Science Co; Ltd., and the viscosity was measured using a DV-III ULTRA CP, trade name, manufactured by Brookfield Engineering Inc. pH was measured using a PH meter HM-30R, trade name, manufactured by DKK-Toa Corporation.

<Composition of Treatment Liquid 1>

| | |
|---|---|
| Malonic acid (manufactured by Wako Pure Chemical Industries Ltd.) | 25% by mass |
| Diethylene glycol monomethyl ether | 20.0% by mass (manufactured by Wako Pure Chemical Industries Ltd.) |
| EMULGEN P109 (trade name, manufactured by Kao Corporation, nonionic surfactant) | 1.0% by mass |
| Ion-exchanged water | 54% by mass |

<Preparation of Maintenance Liquid>

Maintenance liquid was manufactured as a testing solution for evaluating the maintenance property as follows. The preparation of the maintenance liquid was made by mixing each of the following components and sufficiently stirring the mixture.

(Composition of the Maintenance Liquid)

| | |
|---|---|
| Diethylene glycol monomethyl ether (DEGmBE) | 25% |
| Imidazole | 0.51% |
| 1 mol/L of hydrochloric acid | 1.2% |
| Ion-exchanged water | 73.29% |

(pH 7.53)

<Image Forming and Evaluation>

Image forming and evaluation (abrasion resistance, recovery from disuse property, and maintenance property) were performed by using the ink composition and the treatment liquid obtained in the above and doing as follows. The evaluation results are shown in the Table 2 below.

An inkjet head having a silicone nozzle plate as shown in FIG. 1 was prepared. A reservoir tank connected to the inkjet head was refilled with the ink composition obtained as above. Herein, a liquid-repellent film was previously provided on the silicone nozzle plate by using a fluorinated alkylsilane compound. A recording medium (trade name: OK TOPCOAT+1, manufactured by Oji Paper Co., Ltd, basis weight: 104.7 g/m$^2$) was fixed on a stage that was movable in a predetermined linear direction at a speed of 500 mm/sec. The treatment liquid (1) was coated to form a coating film having a thickness of about 1.2 nm on the recording medium using a bar coater with maintaining the temperature at 30° C., and immediately after the coating, the resulted coating film was dried at 50° C. for 2 seconds.

After that, the inkjet head was placed and fixed in a manner such that the direction (W direction in FIG. 2) of the line along which print nozzles were arrayed was inclined at an angle of 75.7° (90°-α in FIG. 2) with respect to the direction (principal scanning direction: X direction in FIG. 2) perpendicular to the moving direction (sub-scanning direction: Y direction in FIG. 2) of the stage. While the recording medium was moved at a constant speed in the sub-scanning direction, the ink was ejected according to the line system under ejection conditions of an ink droplet amount of 3.2 pL, an ejection frequency of 5.5 kHz, and a resolution of 1200 dpi×1200 dpi, so that a 50%-solid image was printed onto a whole surface of a specimen which was formed by cutting the recording medium to A5 size. After recording an image, the image was dried by applying a warm wind of 120° C. to the image-recorded surface at a speed of 5 m/sec for 15 seconds using an air blower, while being heated by an infrared heater from the rear side (back face) of the ink dropped face. After drying the image, the image was cured by irradiating UV light (manufactured by Eye Graphics Co., Ltd., metal halide lamp, the maximum wavelength of irradiation 365 nm) to the extent that the integrated irradiance reached 2 J/cm$^2$.

(Abrasion Resistance Evaluation)

An A5-sized sample with a solid image formed on the entire surface was left alone under the environment of 25° C. and 50% RH for 72 hours, and an unrecorded OK TOP COAT+(trade name, hereinafter, referred as an unused sample in the present evaluation) was overlapped on the solid image surface on the left-alone sample and rubbed back and forth ten times with a load of 20 kg/m$^2$. Then, the unused sample and the solid image were visually observed and evaluated according to the evaluation criteria below.

~Evaluation Criteria~

A: There was no attachment of color on the unused sample, and no degrading of the rubbed solid image was observed.
B: There was attachment of color on the unused sample, but no degrading of the rubbed solid image was observed.
C: There was attachment of color on the unused sample, and degrading of the rubbed solid image in a huge area was observed.

(Recovery from Disuse Property (Ejection Stability in a Case in which the Ink Composition is Stopped from Ejecting in the Inkjet Recording and Left Alone for a Certain Period of Time, and then Ejection of the Ink is Resumed))

Image-coloring photofinishing PRO, trade name, manufactured by Fujifilm Corporation, was used as a recording medium, and print samples (line image) were prepared by moving the stage holding the recording medium at a speed of 248 mm/minute and ejecting 2000 ink droplets from each nozzle in parallel with the conveyance direction to form 96 lines with the amount of ink droplet of 3.4 pL, ejecting frequency of 10 kHz, and nozzle arrangement direction×conveyance direction of 75×1200 dpi. Meanwhile, the details on the other image-forming conditions were substantially similar to the above-mentioned solid image-forming conditions.

Next, the obtained print samples were observed visually, and it was confirmed that ink had been ejected from all the nozzles.

After forming these line images, the head was left alone as it was for a predetermined period of time, and then a new recording medium was attached, and then ink was ejected again under substantially similar conditions to the above to prepare print samples (line image). The obtained print samples (line image) were observed visually, and the recovery from disuse property was evaluated as the longest unused period of time during which all the 96 nozzles could eject when being left alone for a predetermined period of time and resumed to eject 2000 ink droplets. The longer the unused period of time during which no inferior ejection occurred was, the better the ejection property was, and the ejection property was evaluated based on the following criteria.

~Evaluation Criteria~

A: The unused period of time was 45 minutes or more.
B: The unused period of time was from 30 minutes to less than 45 minutes.
C: The unused period of time was from 20 minutes to less than 30 minutes.
D: The unused period of time was less than 20 minutes.
* D refers to a level that causes a problem in practical usage.

(Maintenance Property)

Firstly, ejection of ink and maintenance operation was performed under the following conditions (1) to (3), and the re-ejectability after the maintenance operation was evaluated. Here, the ejection of ink was performed under the predetermined conditions described in the following (1) to (3), and the ejected ink was recovered as it was into an accommodating vessel (not shown), instead of leaving on the recording medium.

In addition, the maintenance operation was performed by spraying 1 mL of the maintenance liquid to the nozzle faces of the head after the ejection of ink, and then wiping (one time) the nozzle faces of the inkjet head with a wiping blade (made of hydrogenated nitrile rubber). Meanwhile, the details of the other image-forming conditions were substantially similar to the above-mentioned line image-forming conditions in the recovery from disuse property evaluation.

The re-ejectability was evaluated according to the following (1) to (3) after forming print samples (line image) under substantially similar conditions to the above-mentioned line image-forming conditions in the recovery from disuse property evaluation shortly after the maintenance operation (no longer than 3 minutes).

~Evaluation Conditions of Re-ejectabilty~

(1) Evaluated as pass in a case in which the ink ejection rate was 90% or more when the blade wiping was performed once shortly after the completion of a 60 minute-long continuous ejection and then line images were formed immediately.
(2) Evaluated as pass in a case in which the ink ejection rate was 90% or more when the blade wiping was performed once after a one minute-long ejection and a 30 minute-long disuse and then line images were formed immediately.
(3) Evaluated as pass in a case in which no smearing was observed on the formed image when the blade wiping was performed once shortly after the completion of a 10 minute-long ejection and then line images were formed immediately.

~Method of Ink Ejection Rate Measurement~

The following is a method of ink ejection rate measurement in the above-mentioned evaluation of the re-ejectability.

At the beginning of the testing, it was visually confirmed that all nozzles ejected by forming print samples (line image) under substantially similar conditions to the above-mentioned recovery from disuse property evaluation conditions, and then the number of ejecting nozzles was counted by visually checking the print samples formed after the maintenance operation according to the above-mentioned conditions from (1) to (3) to compute the ejection rate as follows:

Ejection rate (%)=[number of ejecting nozzles after maintenance]/[total number of nozzles]×100(%)

~Evaluation Criteria for Maintenance Property~

Next, the maintenance property was evaluated using the following evaluation criteria based on the results of the re-ejectability evaluation.

A: In a case in which all three of the re-ejectability from (1) to (3) passed.

B: In a case in which two of the re-ejectability from (1) to (3) passed.

C: In a case in which only one of the re-ejectability from (1) to (3) passed

D: In a case in which all three of the re-ejectability from (1) to (3) failed to pass.

* D refers to a level that causes a problem in practical usage.

TABLE 2

| Ink Name | Maintenance Property | Recovery from Disuse Property | Abrasion Resistance | Comments |
|---|---|---|---|---|
| C-1 | D | D | C | Comparative Example |
| C-2 | A | C | B | Present Invention |
| C-3 | A | B | B | Present Invention |
| C-4 | A | A | A | Present Invention |
| C-5 | B | A | A | Present Invention |
| C-6 | B | B | A | Present Invention |
| C-7 | C | B | A | Present Invention |
| C-8 | A | A | A | Present Invention |
| C-9 | A | A | A | Present Invention |
| C-10 | A | A | A | Present Invention |
| C-11 | B | B | B | Present Invention |
| C-12 | C | C | B | Present Invention |
| C-13 | A | B | A | Present Invention |

As shown in the above-mentioned Table 2, the examples were good in the abrasion resistance of the image, and could obtain an excellent effect in terms of the ejection stability (recovery from disuse property) even in a case in which the ejection of the ink composition was stopped and left alone for a certain period of time and then the ejection was resumed, and also could obtain a good effect in the maintenance property (ease of removing extra ink composition attached to, for example, the members after the ejection of ink). In contrast, the comparative examples were insufficient in terms of these effects in any of the evaluation items.

According to the present invention, it is possible to provide an ink composition, ink set, and an image forming method using the same that can obtain an excellent effect in terms of the ejection stability (recovery from disuse property) even in a case in which the ink composition is stopped from ejecting in the inkjet recording device and left alone for a certain period of time, and then ejection of the ink composition is resumed; and furthermore, are excellent in terms of the maintenance property and the abrasion resistance of images.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An inkjet ink composition comprising color material particles, a water soluble polymerizable compound, a water soluble silicate salt and 30-80% by mass, based on the ink composition, of water.

2. The inkjet ink composition according to claim 1, wherein the water soluble silicate salt is a silicate salt of an alkali metal.

3. The inkjet ink composition according to claim 2, wherein the silicate salt of an alkali metal is represented by the following Formula (S):

$$x(M_2O) \cdot y(SiO_2) \quad \text{Formula (S)}$$

wherein, in Formula (S), M represents sodium or potassium; x represents an integer of 1 or 2; and y represents an integer of from 1 to 4.

4. The inkjet ink composition according to claim 1, further comprising a polymerization initiator that initiates polymerization of the water soluble polymerizable compound by irradiation of actinic energy radiation.

5. The inkjet ink composition according to claim 1, wherein the water soluble polymerizable compound is represented by the following Formula (1):

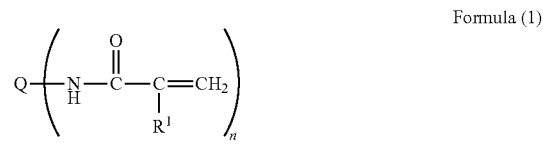

Formula (1)

wherein, in Formula (1), Q represents an n-valent linking group; $R^1$ represents a hydrogen atom or a methyl group: and n represents an integer of 1 or more.

6. The inkjet ink composition according to claim 1, wherein a content of the water soluble silicate salt is in a range of from 0.0001% by mass to 0.5% by mass with respect to a total mass of the ink composition.

7. The inkjet ink composition according to claim 1, wherein a content mass ratio of the water soluble silicate salt to the water soluble polymerizable compound, in the ink composition, is in a range of from 0.00005 to 0.1.

8. The inkjet ink composition according to claim 1, wherein at least a part of a surface of each of the color material particles is covered with a polymer dispersant and the color material particles are water dispersible.

9. The inkjet ink composition according to claim 8, wherein the polymer dispersant comprises a carboxyl group.

10. The inkjet ink composition according to claim 1, further comprising self-dispersing polymer particles.

11. An ink set comprising:
the inkjet ink composition according to claim 1; and
a treatment liquid comprising a coagulant that is adapted to coagulate at least a part of the components in the inkjet ink composition.

12. The ink set according to claim 11, wherein the coagulant is an organic acid.

13. An image forming method comprising discharging the inkjet ink composition according to claim 1 via an inkjet head having a silicon nozzle plate, onto a recording medium, thereby forming an image.

14. The image forming method according to claim 13, further comprising applying a treatment liquid onto the recording medium, the treatment liquid being adapted to form an aggregate when contacted with the inkjet ink composition.

15. The inkjet image forming method of claim 14, wherein the inkjet ink composition is discharged after applying the treatment liquid, and the treatment liquid on the recording medium is heated, dried or a combination thereof, between a time after applying the treatment liquid onto the recording medium and a time of discharging the inkjet ink composition.

16. The inkjet image forming method of claim 13, wherein the recording medium comprises plain paper or coated paper.

* * * * *